United States Patent
Baierlein et al.

(10) Patent No.: US 11,652,641 B2
(45) Date of Patent: May 16, 2023

(54) ARTIFACT LIFECYCLE MANAGEMENT ON A CLOUD COMPUTING SYSTEM

(71) Applicant: SIEMENS AKTIENGESELLSCHAFT, Munich (DE)

(72) Inventors: Thomas Baierlein, Nuremberg (DE); Maik Boche, Oberasbach (DE); Stefan Burger, Munich (DE); Michael Ebert, Coburg (DE); Christina Gallinat, Nuremberg (DE); Preeti Koka, Munich (DE); Riccardo Riedl, Ebermannstadt (DE); Alexander Wahl, Wendelstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/961,334

(22) PCT Filed: May 25, 2018

(86) PCT No.: PCT/EP2018/063758
§ 371 (c)(1),
(2) Date: Jul. 10, 2020

(87) PCT Pub. No.: WO2019/137635
PCT Pub. Date: Jul. 18, 2019

(65) Prior Publication Data
US 2020/0371782 A1    Nov. 26, 2020

(30) Foreign Application Priority Data

Jan. 15, 2018   (EP) .................................... 18151637

(51) Int. Cl.
*H04L 9/32* (2006.01)
*H04L 9/08* (2006.01)
(Continued)

(52) U.S. Cl.
CPC .............. *H04L 9/3239* (2013.01); *G06F 8/60* (2013.01); *G06F 8/77* (2013.01); *G06F 9/485* (2013.01);
(Continued)

(58) Field of Classification Search
None
See application file for complete search history.

(56) References Cited

U.S. PATENT DOCUMENTS 9,378,255 B2 * 6/2016 Jaeger ....................... G06F 8/61
9,477,454 B2 * 10/2016 Scheiner ................... G06F 8/61
(Continued)

OTHER PUBLICATIONS

Das, "Integrating Cloud Service Deployment Automation With Software Defined Environments", 2014, University of Stuttgart (Year: 2014).*

(Continued)

*Primary Examiner* — Hossain M Morshed
(74) *Attorney, Agent, or Firm* — Lempia Summerfield Katz LLC

(57) ABSTRACT

An artifact lifecycle management on a cloud computing system and methods of managing are disclosed herein. In one embodiment, a method includes providing an integrated development environment for developing an artifact to be deployed in a productive environment of the cloud computing system; generating an artifact package associated with the artifact based on inputs received via the integrated development environment; performing one or more tests on the artifact package using the integrated development environment based on or more test cases; performing one or more validation checks on the artifact to be deployed in the productive environment; deploying the validated artifact in the productive environment; provisioning the deployed artifact to one or more tenants of the cloud computing system;

(Continued)

and providing access to the artifact to the one or more tenants based on a role and permissions assigned to each of the tenants.

38 Claims, 14 Drawing Sheets

(51) Int. Cl.
    *H04L 61/2592*     (2022.01)
    *G06F 8/60*     (2018.01)
    *G06F 8/77*     (2018.01)
    *G06F 11/36*     (2006.01)
    *G06F 21/44*     (2013.01)
    *G06F 9/48*     (2006.01)
    *G06F 9/50*     (2006.01)

(52) U.S. Cl.
    CPC .......... *G06F 9/5027* (2013.01); *G06F 9/5072* (2013.01); *G06F 11/3608* (2013.01); *G06F 11/3688* (2013.01); *G06F 21/44* (2013.01); *H04L 9/088* (2013.01); *H04L 9/3242* (2013.01); *H04L 9/3247* (2013.01); *H04L 9/3271* (2013.01); *H04L 61/2592* (2013.01)

(56) References Cited

U.S. PATENT DOCUMENTS

| | | | | |
|---|---|---|---|---|
| 10,303,517 | B1* | 5/2019 | Sloyan | G06F 11/3616 |
| 10,353,798 | B1* | 7/2019 | Diac | G06F 8/30 |
| 10,394,697 | B2* | 8/2019 | Atyam | G06F 11/3676 |
| 2003/0233585 | A1* | 12/2003 | Quick | G06F 11/3604 |
| | | | | 717/124 |
| 2011/0126168 | A1* | 5/2011 | Ilyayev | G06F 9/5072 |
| | | | | 717/103 |
| 2013/0219307 | A1* | 8/2013 | Raber | G06F 8/355 |
| | | | | 715/763 |
| 2013/0232480 | A1* | 9/2013 | Winterfeldt | G06F 9/5072 |
| | | | | 717/177 |
| 2013/0297673 | A1* | 11/2013 | McGrath | G06F 9/505 |
| | | | | 709/203 |
| 2014/0096135 | A1* | 4/2014 | Kundu | G06F 9/455 |
| | | | | 718/1 |
| 2014/0280961 | A1* | 9/2014 | Martinez | H04L 41/40 |
| | | | | 709/226 |
| 2014/0313542 | A1* | 10/2014 | Benchorin | G06F 3/0488 |
| | | | | 358/1.15 |
| 2015/0120886 | A1 | 4/2015 | Sapaliga | |
| 2015/0199188 | A1* | 7/2015 | Mantripragada | G06F 21/121 |
| | | | | 717/101 |
| 2015/0212893 | A1* | 7/2015 | Pawar | G06F 11/1456 |
| | | | | 707/649 |
| 2016/0055072 | A1* | 2/2016 | Baloch | G06F 8/656 |
| | | | | 717/121 |
| 2016/0085666 | A1* | 3/2016 | Jordan | H04L 67/01 |
| | | | | 714/38.1 |
| 2016/0156661 | A1* | 6/2016 | Nagaratnam | H04L 63/20 |
| | | | | 726/1 |
| 2016/0323368 | A1* | 11/2016 | Jain | H04L 67/1001 |
| 2017/0006119 | A1* | 1/2017 | Pogrebinsky | G06F 3/0482 |
| 2018/0060066 | A1* | 3/2018 | Rihani | G06F 9/45558 |
| 2018/0276315 | A1* | 9/2018 | Kanuparthy | G06F 30/00 |
| 2019/0146810 | A1* | 5/2019 | Ganesh | G06F 9/5077 |
| | | | | 718/1 |
| 2021/0109845 | A1* | 4/2021 | Shah | G06F 9/547 |

OTHER PUBLICATIONS

International Preliminary Report on Patentability for International Patent Application PCT/EP2018/063758 dated May 7, 2020.
European Search Report for European Application No. 18151637. 8-1224 dated Apr. 20, 2018.

* cited by examiner

FIG. 11

ARTIFACT LIFECYCLE MANAGEMENT ON A CLOUD COMPUTING SYSTEM

The present patent document is a § 371 nationalization of PCT Application Serial No. PCT/EP2018/063758, filed May 25, 2018, designating the United States, which is hereby incorporated by reference, and this patent document also claims the benefit of European Patent Application No. 18151637.8, filed Jan. 15, 2018, which is also hereby incorporated by reference.

TECHNICAL FIELD

The present disclosure generally relates to a cloud computing system, and more particularly relates to artifact lifecycle management on the cloud computing system.

BACKGROUND

With the advent of cloud computing technology, a large number of devices (also known as 'assets') are connected to a cloud computing system via the Internet. The devices may be remotely located from the cloud computing system. For example, the devices may be equipment, sensors, actuators, robots, or machinery in an industrial set-up(s). The devices may also be medical devices and equipment in a healthcare facility. Furthermore, the devices may be home appliances or office appliances.

The cloud computing system may enable remote commissioning, configuring, monitoring, controlling, and maintaining the connected devices. Also, the cloud computing system may facilitate storing large amounts of data periodically gathered from the devices, analyzing the large amounts of data, and providing insights (e.g., Key Performance Indicators, Outliers) and alerts to operators, field engineers, or owners of the devices via graphical user interface (e.g., of web applications). The insights and alerts may enable to control and maintain the devices, leading to efficient and fail-safe operation of the devices. The cloud computing system may also enable modifying parameters associated with the devices and issues control commands via the graphical user interface based on the insights and alerts.

The cloud computing system may include a plurality of servers or processors (also known as 'cloud infrastructure'), which may be geographically distributed or co-located, connected with each other via a network. A dedicated platform (hereinafter referred to as 'cloud computing platform') is installed on the servers/processors for providing above functionality as a service (hereinafter referred to as 'cloud service'). The cloud computing platform may include a plurality of software programs executed on one or more servers or processors of the cloud computing system to enable delivery of the requested service to the devices and its users (hereinafter referred to as tenants).

One or more artifacts are deployed in the cloud computing system to provide different cloud services to the tenants. The artifacts may include applications, simulation models, engineering configuration, application programming interfaces (APIs), and so on. For example, an application for monitoring operation of robots in a manufacturing facility may be deployed as an artifact. The application may be capable of analyzing the data collected from the robots over a period of time. The tenant may subscribe to a cloud service which analyzes the data associated with the robots (for which the tenant is responsible) using the application, and displays the outcome of analysis (e.g., outliers) to the tenant via a web application on the tenant device.

Currently, the artifacts are developed in an offline mode by developers using native development tools. Then, the artifacts are uploaded to the cloud computing system via a web browser. The artifacts are deployed in the cloud computing platform and provisioned to one or more tenants. However, development stage, deployment stage, and provisioning stage of artifacts are independent of each other. The currently known cloud computing systems do not provide a cloud computing platform capable of managing artifacts throughout its lifecycle. This makes managing artifacts during the cloud computing system's lifecycle a time consuming and cumbersome task.

In light of the above, there exists a need for a cloud computing system for managing artifacts throughout their lifecycle.

SUMMARY AND DESCRIPTION

Therefore, it is the object of the present disclosure to provide a cloud computing system capable of managing artifacts throughout their lifecycle.

The scope of the present disclosure is defined solely by the appended claims and is not affected to any degree by the statements within this summary. The present embodiments may obviate one or more of the drawbacks or limitations in the related art.

Each artifact during the cloud computing system's lifecycle may go through different stages such as development, testing, validation, deployment, provisioning, and real-time execution. The artifact may refer to a cloud application, an edge application, code snippet, hardware configuration, digital twin model, application programming interface (API), simulation model, connectivity solution, firmware, device configuration, security application, and so on. In some embodiments, the artifact may enable one or more tenants of a cloud computing system to access one or more cloud services provided by the cloud computing system. For example, the one or more cloud services enable the one or more tenants to efficiently commission, configure, monitor, control, and maintain an industrial plant communicatively connected to the cloud computing system.

According to the present disclosure, the cloud computing system provides a cloud computing platform for developing, testing, validating, deploying, provisioning, and monitoring each artifact associated with cloud service delivered by the cloud computing system. Thus, the cloud computing system enables management of artifact during its lifecycle. This is referred to as 'Artifact Lifecycle Management'. The artifact lifecycle management on the cloud computing platform enables interaction between different stages during lifecycle of the artifact, thereby making management of artifact easy and efficient during its lifecycle.

The object of the present disclosure is achieved by a method of managing an artifact during its lifecycle on a cloud computing system. The method includes identifying an artifact to be deployed on a cloud computing system. The method further includes performing one or more validation checks on the artifact to be deployed on the cloud computing system. Furthermore, the method includes deploying the validated artifact in a productive environment of the cloud computing system. Moreover, the method includes provisioning the deployed artifact to one or more tenants of the cloud computing system. Consequently, the one or more tenants may access cloud services using the provisioned artifacts. Advantageously, the one or more tenants may manage their assets in a facility using the cloud services.

Also, artifacts may be validated, deployed, provisioned, and accessed from a single cloud computing system.

In an embodiment, the method may include providing an integrated development environment for developing the artifact to be deployed on the cloud computing system. Advantageously, the integrated development environment may provide necessary tools to develop and test the artifact on the cloud computing system. In one embodiment, the method may include determining a type of integrated development environment required for developing the artifact and generating the integrated development environment of the determined type on a graphical user interface of a user device. Consequently, different types may be developed using a suitable integrated environment. Advantageously, the cloud computing system provides flexibility and scalability in developing different categories of artifacts. The method may include generating an artifact package associated with the artifact based on inputs via the integrated development environment. Advantageously, the cloud computing system enables development of the artifact via the integrated development environment.

Furthermore, the method may include performing one or more tests on the artifact package using the integrated development environment based on or more test cases. Advantageously, defects in the artifact may be identified and fixed using the cloud computing system prior to deploying the artifact on the cloud computing system. Additionally, the method may include assigning a unique identifier to the artifact package associated with the artifact. Advantageously, the unique identifier enables tracking of the artifact throughout its lifecycle. Moreover, the method may include storing the artifact package associated with the artifact in an artifact repository using the integrated development environment. Advantageously, the artifacts may be developed, tested, and stored using the cloud computing system. The artifact package stored in the artifact repository may be used to validate, deploy, and provision the artifact without a need for uploading and downloading the artifact package each time.

In another embodiment, the method may include determining a category of the artifact to be validated based on the unique identifier associated with the artifact. For example, a category of artifact refers to whether the artifact is a cloud application, hardware configuration, digital twin model, application programming interface, etc. Each category may need a specific set of validation checks to be performed. The method may include determining one or more validation checks suitable for validating the artifact from a plurality of validation checks based on the determined category of the artifact. Advantageously, the cloud computing system may validate artifacts of different categories, thereby providing greater flexibility in managing the artifacts. Furthermore, the method may include validating the artifact to be deployed in the productive environment of the cloud computing system by performing the determined validation checks on the artifact. Additionally, the method may include determining whether the validation checks performed on the artifact are successful. If the validation checks are successful, the method may include generating a notification indicating the validation checks are successful. If any of the validation checks is unsuccessful, the method may include determining defects in the artifact and corrective actions to be performed to resolve the defects. Moreover, the method may include performing one or more corrective actions on the artifact package to resolve the defects. Additionally, the method may include providing a feedback to an owner of the artifact. The feedback indicates that the validation of artifact was unsuccessful along with the determined defects and the corrective actions recommended for resolving the defects in the artifact. Advantageously, the cloud computing system provides that the artifacts meet requirements (e.g., to eliminate security risks) prior to deploying the artifacts on the cloud computing system, thereby providing delivery of secured cloud services to the tenants. Also, the cloud computing system identifies and fixes the defects in the artifacts (e.g., using artificial intelligence techniques). Additionally, the cloud computing system provides feedback to owner of the artifacts regarding the defects, thereby enabling closed-loop development of the artifacts.

In yet another embodiment, the method may include generating an artifact signature for the validated artifact using the artifact package. For example, the artifact signature may be generated by applying cryptographic algorithm to the artifact package. The cryptographic algorithm may be secure hashing algorithm (SHA-2). Advantageously, the cloud computing system protects validated artifacts using a unique artifact signature.

In further another embodiment, the method may include assigning the artifact to at least one provider for deploying the artifact in the productive environment of the cloud computing system. Consequently, the artifact may be accessed by the provider of the artifact. Advantageously, the cloud computing system enables providers to access and deploy artifacts developed by different developers.

In still another embodiment, the method may include determining one or more components required for deploying the artifact package in the productive environment of the cloud computing system. For example, the one or more components may include specific application programming interfaces and database services required for deploying the artifact in the productive environment. Also, the method may include providing a list of recommended components required for deploying the artifact in the productive environment of the cloud computing system. Advantageously, the cloud computing system enables efficient and easy deployment of the artifact without having a need to obtaining the components from external sources, thereby saving time and efforts.

In another embodiment, the method may include verifying authenticity of the artifact using the artifact signature associated with the artifact, and deploying the artifact in the productive environment of the cloud computing system if the artifact is successfully verified. Advantageously, the cloud computing system provides that the authentic artifacts are deployed in the productive environment, thereby securing the assets of the tenants from security risk.

In further another embodiment, the method may include publishing the artifact deployed in the productive environment of the cloud computing system. Advantageously, the artifacts deployed in the productive environment may be searched and displayed to tenants of the cloud computing system, thereby enabling the tenants to subscribe access to the artifacts.

In still another embodiment, the method may include creating a set-up route between the deployed artifact and the tenants of the cloud computing system. Consequently, artifacts deployed in the productive environment are provisioned to the tenants. Advantageously, the cloud computing system enables the tenants to access the artifacts via the set-up route.

In another embodiment, the method may include monitoring performance of the artifact deployed in the productive environment in real-time. Also, the method may include determining abnormal behavior of the artifact deployed in the productive environment in real-time, and generating a notification indicating the abnormal behavior of the artifact to one or more entities. For example, the abnormal behavior may be an issue associated with performance, resource consumption, abnormal function, etc. The entities may be developers, providers, and/or tenants associated with the artifacts with abnormal behavior. Advantageously, the cloud computing system provides real-time updates on behavior of the artifacts post deployment in the productive environment. This helps the developer, the provider, and the tenant to take appropriate measures to address the abnormal behavior of the artifacts efficiently. Also, this helps the developer to develop a new version of artifact based on the issues encountered by the current version of the artifact.

In yet another embodiment, the method may include suspending execution of the artifact in the productive environment of the cloud computing system. Advantageously, the cloud computing system may prevent the assets of the tenants from hazards due to malfunctioning of the artifacts.

In further embodiment, the method may include providing access to the artifact to the one or more tenants based on a role and permissions assigned to each of the tenants. For example, the role may be admin role or standard role. The permissions associated with the admin role may be read access and write access. The permission associated with the standard role may be read access. Advantageously, the cloud computing system provides that the artifacts are not accessed by unauthorized tenants, thereby securing the assets of the authorized tenants.

In still another embodiment, the method may include displaying lifecycle status information associated with the artifact on a graphical user interface of a user device. The lifecycle status may be a stage associated with the artifact and status associated with artifact. The stage may be a development stage, validation stage, deployment stage, provisioning stage, or real-time execution stage. The status may be in-development, testing failed, registered, upload initiated, validation success, validation failure, deployment complete, provisioning complete, crashed, and so on. Advantageously, the cloud computing system enables tracking of artifacts along their lifecycle.

The object of the present disclosure is also achieved by a cloud computing system includes one or more processing units, and at least one memory unit communicatively coupled to the one or more processing units. The memory unit includes an artifact lifecycle management module stored in the form of machine-readable instructions executable by the one or more processing units. The artifact lifecycle management module is configured to perform or initiate any of the method acts described above.

The object of the present disclosure is also achieved by a system including a cloud computing system described above; and a plurality of tenant devices communicatively coupled to the cloud computing system. Each of the plurality of tenant devices is capable of accessing one or more artifacts deployed on the cloud computing system.

The object of the present disclosure is also achieved by a computer program product including instructions which, when executed by the cloud computing system described above, cause the cloud computing system to carry out any of the method acts described above.

BRIEF DESCRIPTION OF THE DRAWINGS

The above-mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which:

FIG. 11 illustrates an example of a graphical user interface showing status of the application provisioned to tenants.

DETAILED DESCRIPTION

Figure 1:
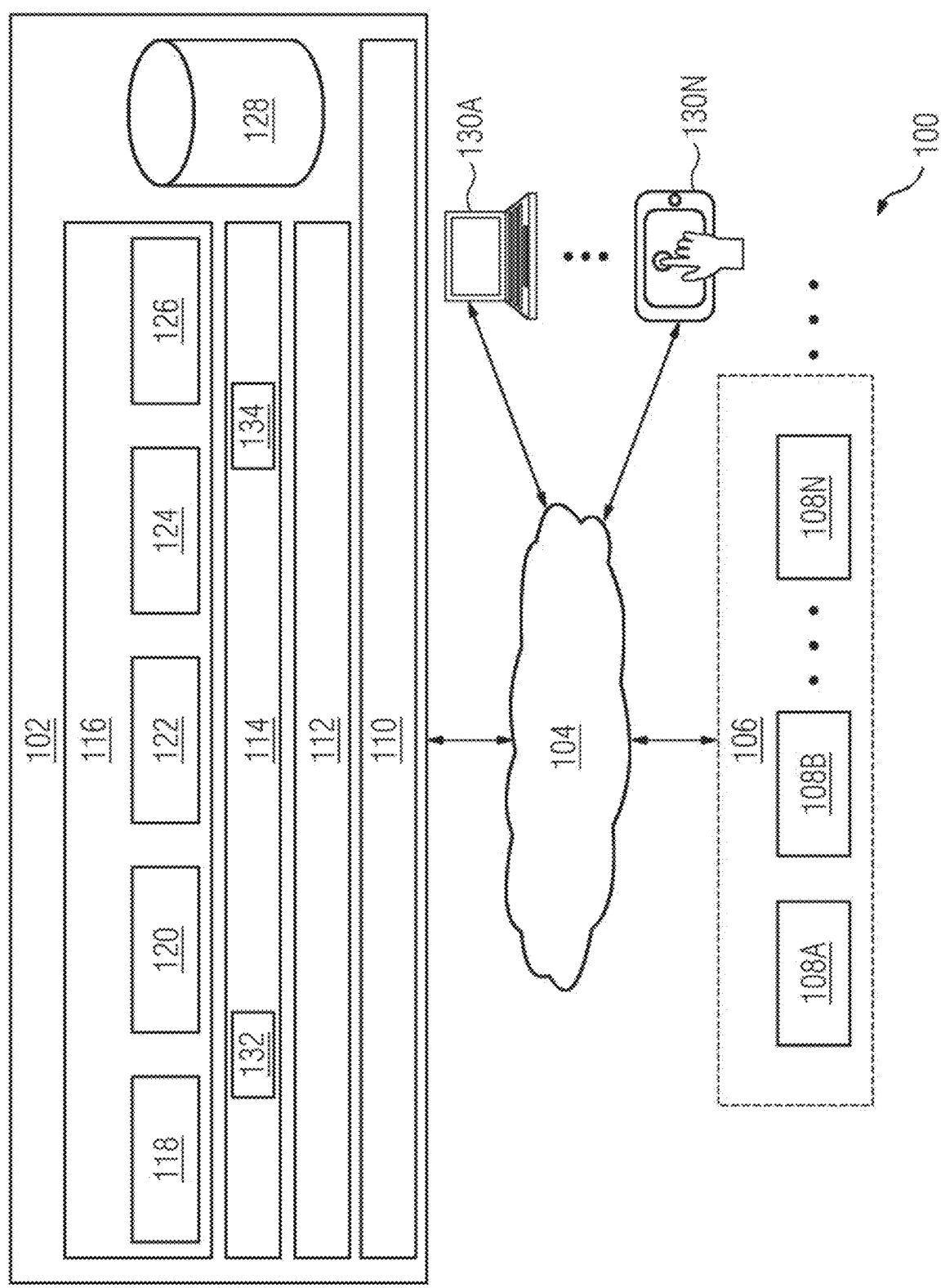
FIG. 1 is a schematic representation of a cloud computing system capable of managing artifacts throughout the lifecycle, according to an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Throughout the specification, the terms 'cloud computing system' and 'cloud system' mean the same. Also, the terms 'cloud computing platform' and 'cloud platform' mean the same.

FIG. 1 is a schematic representation of an IoT-cloud environment 100, according to an embodiment. Particularly, FIG. 1 depicts the cloud system 102 which is capable of providing cloud services for managing an industrial plant 106 including assets 108A-N. The cloud computing system 102 is connected to assets 108A-N in the industrial plant 106 via a network 104 (e.g., Internet). The assets 108A-N may include servers, robots, switches, automation devices, motors, valves, pumps, actuators, sensors, and other industrial equipment. Although, FIG. 1 illustrates the cloud computing system connected to one Industrial plant, one skilled in the art may envision that the cloud computing system 102 may be connected to several industrial plants located at different locations via the network 104. For example, the cloud services may include commissioning the industrial plant 106, simulating the industrial plant 106, monitoring and controlling the industrial plant 106, maintaining the industrial plant 106, upgrading the industrial plant 106, and so on. The cloud services may also include managing assets in the industrial plant 106, storing and analyzing plant data received from the assets 108A-N via IoT gateway (not shown), visualizing the analyzed data to personnel associated with the industrial plant 106, downloading software/firmware onto the assets, etc.

In order to access the cloud services, one or more artifacts are required to be deployed on a cloud computing platform, which are then accessed by personnel and assets in the industrial plant 106 to avail the cloud services. Therefore, the cloud computing system 102 is provided which is capable of managing artifacts throughout its lifecycle. Exemplary artifacts may include applications (application for monitoring plant), simulation models, engineering configuration, digital twin models, code snippets, APIs, security applications, firmware, microservices, and so on.

The cloud computing system 102 is also connected to user devices 130A-N via the network 104. The user devices 130A-N may access the cloud computing system 102 for managing and/or accessing the artifacts and accessing the cloud services.

The cloud computing system 102 includes a cloud interface 110, cloud hardware and OS 112, a cloud computing platform 114, and an artifact repository 128. The cloud interface 110 enables communication between the cloud computing platform 114 and the industrial plant 106. Also, the cloud interface 110 enables communication between the cloud computing platform 114 and the user devices 130A-N.

The cloud hardware and OS 112 may include one or more servers on which an operating system is installed and including one or more processing units, one or more storage devices for storing data, and other peripherals required for providing cloud computing functionality. The cloud computing platform 114 is a platform which implements functionalities such as data storage, data analysis, data visualization, data communication on the cloud hardware and OS 112 via APIs and algorithms; and delivers the aforementioned cloud services using artifacts. The cloud computing platform 114 employs an artifact lifecycle management module 116 for managing artifacts responsible for delivering cloud services throughout its lifecycle. The cloud computing platform 114 also includes an access control module 132, and an artifact execution module 134. The cloud computing platform may include a combination of dedicated hardware and software built on top of the cloud hardware and OS 112.

The artifact lifecycle management module 116 is stored in the form of machine-readable instructions and executable by the cloud computing platform 114. The artifact lifecycle management module 116 includes an artifact development module 118, an artifact validation module 120, an artifact deployment module 122, an artifact provisioning module 124, and an artifact monitoring module 126. The artifact development module 118 is configured for generating a development environment for developing an artifact. The development environment is made accessible via a graphical user interface of the user device 130A-N using valid credentials. The artifact development module 118 is configured for generating an artifact package of the artifact using the development environment. If the artifact is an application, the artifact package may include binary code and a manifest file. Additionally, the artifact development module 118 is configured for testing the artifact package using one or more test scenarios via the development environment. The artifact development module 118 is configured to store the artifact in the artifact repository 128 for validation and deployment purposes. The artifact development module 118 is configured to receive feedback on the artifact from the artifact validation module 120, the artifact deployment module 122, and the user devices 130A-N. The artifact development module 118 is configured to process the feedback and make necessary changes to the artifact so that the artifact may be deployed and used without any issues.

The artifact validation module 120 is configured to automatically validate an artifact to be deployed on the cloud computing platform 114. The artifact deployment module 122 is configured to deploy the validated artifact in a productive environment of the cloud computing platform 114. The productive environment is a live system which makes the artifact usable by tenants. In other words, the deployed artifact is executed in the productive environment when the tenant accesses the artifact.

The artifact provisioning module 124 is configured to provision the deployed artifact to one or more tenants of the cloud computing platform 114. In other words, artifact provisioning module 124 is configured to assign the artifact to requesting tenants. When the artifact is provisioned to the artifact, the artifact is displayed on a user interface of a tenant device (e.g., the user device 130A). The tenant may access cloud services using the provisioned artifact. Alternatively, the tenant may access the artifact itself using the tenant device 130A. The tenant may be owner of assets in the industrial plant 106 who has subscribed to the artifacts deployed on the cloud computing platform 114. The tenant user associated with the tenant may be a tenant administrator of the industrial plant 106 who may assign rights to access the artifact deployed on the cloud computing platform 114 to sub-tenants (e.g., other tenant users). In the industrial plant 106, the sub-tenants may include but not limited to plant operators, field engineers, commissioning agents, IoT agents, IoT gateways, industrial assets, remote devices such as mobile, tablet, laptops, and so on. The artifacts deployed on the cloud computing platform 114 may enable the tenants to commission the industrial plant 106, monitor and control the assets 108A-N in the industrial plant 106 and its operation, conduct maintenance of the industrial plants 106 and its assets 108A-N, configure an automation system in the industrial plant 106, monitor and control the automation system in the industrial plant 106 using various services provided by the cloud computing platform 114. Additionally, the artifact may enable the tenants to configure the assets 108A-N using the cloud services, onboard assets on to the cloud computing platform 114, send real-time raw plant data (e.g., operational data collected by sensors deployed in the industrial pant 106) to the cloud computing platform 114 via an IoT gateway, retrieve aggregated plant data from the cloud computing system 102, analyze the plant data or a specific condition, visualize the analyzed plant data, access digital twin models of assets, perform simulation of plant environment using digital twin models, manage IoT devices, download different versions of firmware, etc. using the cloud services provided by the cloud computing platform 114. The artifact may also be responsible for processing requests from the sub-tenants by invoking appropriate APIs and providing output to the tenants on the graphical user interface based on the execution of the APIs and its functions.

The access control module 132 is configured to provide access to the artifact to authorized sub-tenant based on role and permissions assigned to the authorized sub-tenant. Accordingly, the artifact execution module 134 is configured to perform one or more operations by executing the artifact deployed in the productive environment based on request(s) from the sub-tenant and send a response to the sub-tenant. For example, the tenant may request for aggregated time series data (e.g., speed of motor for one hour) associated with a motor to a data visualization API via a web interface of the user device 130A. The artifact execution module 134 may execute artifact files of the data visualization API to fetch the aggregated time series data associated with the motor and provide visualization of the aggregated time series data on the web interface of the user device 130A.

The artifact monitoring module 126 is configured to monitor performance of the artifact deployed in the productive environment during runtime (execution of the artifact on the cloud computing platform 114). The artifact monitoring module 126 is configured to determine abnormal behavior of the artifact deployed in the productive environment in real-time. The artifact monitoring module 126 is configured to provide feedback to the artifact development module 118, the artifact deployment module 122, and the tenants 106 via the user devices 130A-N. For example, the artifact monitoring module 126 generates a notification indicating abnormal behavior of the artifact. The artifact monitoring module 126 is configured to suspend execution of the artifact deployed in the productive environment.

The interaction between different modules of the artifact lifecycle management module 116 is described in greater detail below.

Figure 2:
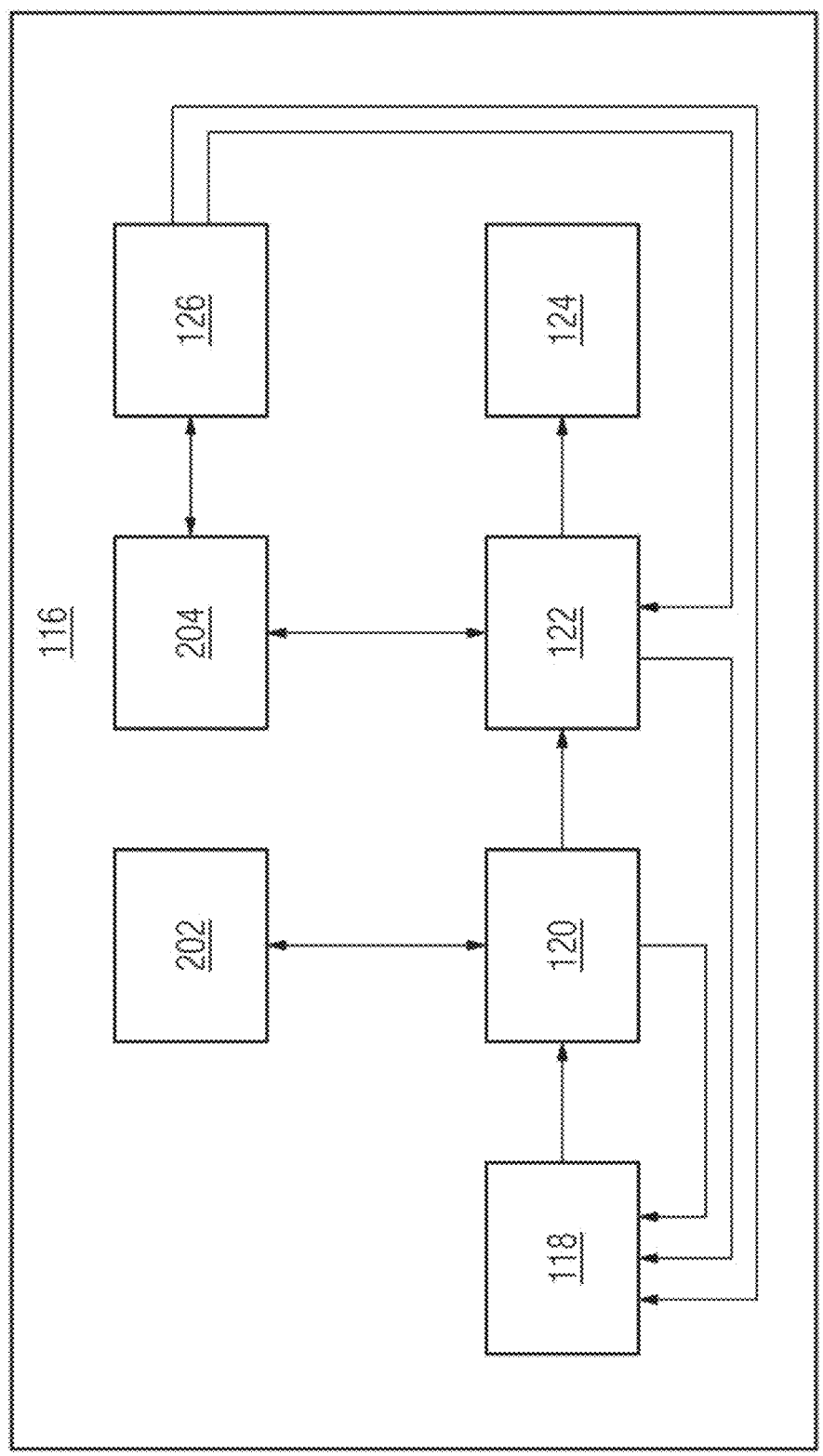
FIG. 2 is a diagrammatic representation illustrating high level interaction between different components of an artifact lifecycle management module, according to an embodiment.

FIG. 2 is a diagrammatic representation illustrating high level interaction between different components of the artifact lifecycle management module 116, according to an embodiment. In an exemplary operation, the artifact development module 118 generates an artifact package (e.g., binary code with APIs, manifest files, and database files) of an artifact (e.g., software application) based on user inputs provided via an integrated development environment. The artifact development module 118 assigns a unique identifier to the artifact. Also, the artifact development module 118 performs testing of the artifact using different test scenarios and stores the artifact package in the artifact repository 128 if the artifact passes the tests.

The artifact validation module 120 monitors new artifacts being stored in the artifact repository 128. Accordingly, when a new artifact is stored, the artifact validation module 120 automatically identifies a new artifact stored in the artifact repository 128. The artifact validation module 120 determines category of the artifact stored in the artifact repository 128 from a plurality of categories using the artifact identifier and determines one or more validation checks to be performed on the artifact based on the category of artifact. For example, if the artifact is a software application, then the artifact validation module 120 performs virus scan of the binary code or artifact package during pre-check, dependency check during static screening, and check behavior of the artifact by executing the artifact in a sandbox environment 202 during dynamic screening.

The artifact validation module 120 performs validation of the artifact using the determined validation checks. The artifact validation module 120 signs the artifact using an artifact signature (e.g., hash key) and stores the artifact signature associated with the artifact in the artifact repository 128. In some embodiments, the artifact validation module signs the artifact using checksum or certificate. Also, the artifact validation module 120 sends a first notification to the artifact development module 118 indicating the artifact validation is successfully performed.

If the artifact validation is not successful, the artifact validation module 120 determines reasons for unsuccessful validation of the artifact. The artifact validation module 120 determines whether the issues in the artifact may be resolved automatically. In such case, the artifact validation module 120 performs corrective actions on the artifact using a machine learning model. The machine learning model is pre-trained to resolve issues in the artifact if the validation of the artifact is unsuccessful. The artifact validation module 120 performs a validation check(s) which was unsuccessful on the modified artifact.

If the issues cannot be resolved, then the artifact validation module 120 sends a second notification to the artifact development module 118 indicating the reasons for unsuccessful validation of the artifact. The developer may fix the issues in the artifact based on the second notification using the development environment and store the updated version of the artifact in the artifact repository 128. Accordingly, the artifact validation module 120 performs validation of new version of the artifact.

Based on the first notification, the artifact development module 118 assigns the artifact for deployment in a productive environment 204 to a provider/deployer. The artifact deployment module 122 downloads the artifact package associated with the artifact from the artifact repository 128. Also, the artifact deployment module 122 may provide APIs and other services such as database services required for deployment of the artifact on the cloud computing platform 114. The artifact deployment module 122 authenticates the artifact based on the artifact signature. If the artifact is authenticated successfully, then the artifact deployment module 122 deploys the artifact in the productive environment 204 of the cloud computing platform 114 using the artifact package, APIs, and database services. Because the artifact is deployed in the productive environment 204, the artifact may be accessed and used to perform associated functions such as commissioning, configuring, monitoring, controlling, and/or maintaining assets 108A-N in the industrial plant 106 via the cloud computing platform 114.

Accordingly, the artifact deployment module 122 may test the behavior of the artifact in the productive environment 204. If the performance of the artifact is satisfactory, the artifact deployment module 122 assigns the artifact to one or more tenants who have requested the access to the artifact. Accordingly, the artifact provisioning module 124 provisions the artifact to the requested tenants. The access to the artifact may refer to using one or more cloud services hosted on the cloud computing platform 114 by accessing the artifact deployed in the productive environment 204 via the user devices 130A-N.

The artifact monitoring module 126 monitors behavior of the artifact during runtime and reports the abnormal behavior of the artifact to the owner of the artifact, the provider of the artifact and the tenant of the artifact. In one embodiment, the artifact deployment module 122 may temporarily suspend the execution of the artifact in case abnormal behavior is reported. In another embodiment, the artifact deployment module 122 may uninstall the artifact from the productive environment 204 in case abnormal behavior is reported. In this manner, the artifact is developed, validated, deployed, provisioned, and monitored using the cloud computing platform 114.

Figure 3:
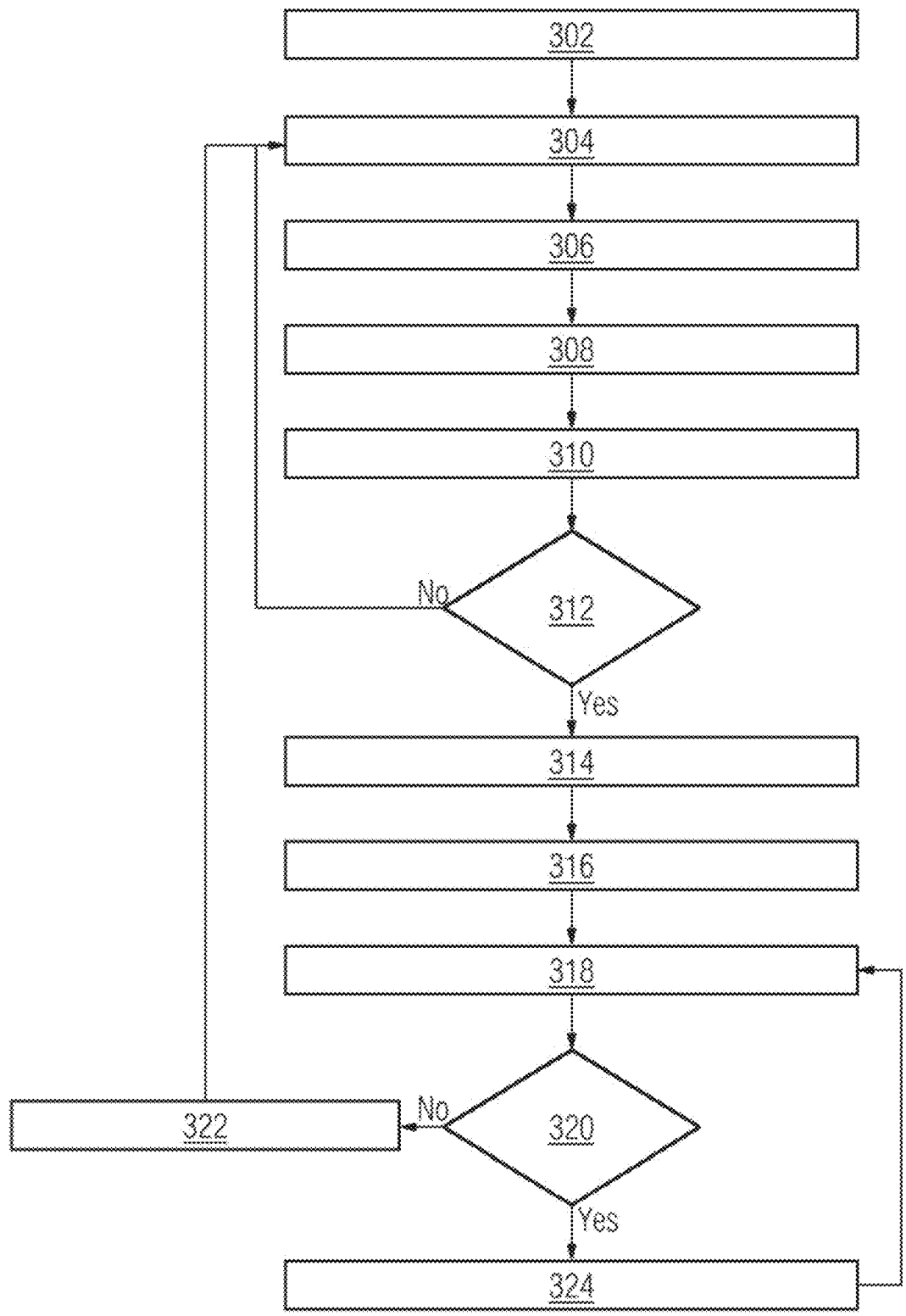
FIG. 3 is a process flowchart illustrating an exemplary method of artifact lifecycle management on the cloud computing system, according to an embodiment.

FIG. 3 is a process flowchart 300 illustrating an exemplary method of artifact lifecycle management on a cloud computing system, according to an embodiment. At act 302, a development environment is provided on the cloud computing platform 114. The development environment may include providing a user interface with necessary tools and software, hosted on the cloud computing platform 114, such that the development environment enables the developer to develop and test artifacts to be deployed on the cloud computing platform 114. In some embodiments, the development environment may be collaborative development environment which enables developers to develop an artifact from remote locations individually or in collaborative manner.

For example, if the artifact is a software application, then the development environment provides a user interface to generate application package (e.g., set of files related to the software application). The development environment may be created and displayed based on profile information of the developer. In some embodiments, different development environments are set up for different developers based on their profile information. Also, the development environment may be provided based on category of artifact to be developed. If the artifact to be developed is a cloud application, then the development environment suitable for generating the application may be provided. However, if the artifact to be developed is an engineering configuration, then the development environment for generating engineering configuration for an automation system is generated. The development environment is hosted on the cloud computing system 102. The development environment is sometimes referred to as 'integrated development environment'.

At act 304, an artifact is developed using the integrated development environment. In one embodiment, the artifact is developed using artificial intelligence (AI) algorithms. In another embodiment, the artifact is developed based on inputs from the developer. At act 306, the artifact is tested in the integrated development environment using different test scenarios. At act 308, the artifact is stored in the artifact repository 128. For example, the artifact package including binary code, manifest files, database files, and associated APIs are stored in the artifact repository 128. The artifact is also assigned a unique identifier so that the artifact may be searched and retrieved from the artifact repository 128 from time to time. Also, the unique identifier helps in tracking the artifact during its lifecycle. The artifact is also assigned a version number which would help in managing artifacts based on versions.

At act 310, validation is performed on the artifact. For example, one or more validation checks are performed on the artifacts. If the validation checks are successful, the artifact is signed using an artifact signature (e.g., hash key). The artifact signature associated with the artifact is stored in the artifact repository 128. At act 312, it is determined whether the validation performed on the artifact is successful. If the validation is not successful, feedback is provided to the developer indicating the validation checks which have failed and reasons for failure. The developer may fix the issues in the artifact and store the modified artifact in the artifact repository 128. The validation checks are performed again, when the modified artifact is automatically determined in the artifact repository 128. If the validation is not successful, then the artifact may be automatically modified based on corrective actions. The corrective actions are automatically computed based on machine learning techniques (e.g., AI models) and so on. Then, the validation checks are performed on the modified artifact. In some embodiments, the cloud computing platform 114 selectively performs the validation checks which the artifact failed previously. This would save time and resources in validating the artifact.

If the validation of the artifact is successful, then at act 314, the artifact is authenticated and deployed in a productive environment (e.g., the productive environment 204). In some embodiments, if the validation of the artifact is successful, then the artifact is assigned to an appropriate provider/deployer by the developer. Accordingly, the artifact is displayed in a graphical user interface (e.g., web interface) of the concerned provider/deployer. Thereafter, the provider initiates deployment process. Alternatively, the artifact may be automatically deployed in the productive environment 204 of the cloud computing platform 114 once the validation of the artifact is successful.

At act 316, the artifact is provisioned to one or more tenants of the cloud computing platform 114. In some embodiments, the artifact provisioning module 124 establishes a set-up route between the artifact in the productive environment 204 and profile of the tenants. This enables the authorized tenants to view, access and use the artifact and its functionality via the cloud computing platform 114. At act 318, the artifact deployed on the cloud computing platform 114 is monitored in real-time. For example, the artifact is monitored for malicious behavior, performance, suspicious activity, high resource consumption, and so on. At act 320, it is determined whether the operation of the artifact is normal. If it is determined that the operation of the artifact is not normal, then at act 322, the execution of the artifact on the cloud computing platform 114 is suspended temporarily or un-deployed from the productive environment 204 based on the nature of the issue. Accordingly, a feedback notification indicating abnormal behavior of the artifact is provided to the developer of the artifact, the tenant of the cloud computing platform 114, and the provider of the artifact. Additionally, the feedback notification may be sent to the artifact validation module 120 so that the artifact validation module 120 considers the feedback during validation of the modified artifact. The developer may modify the artifact based on the feedback notification. The artifact may be revalidated and/or re-deployed in the productive environment 204. Then, the modified artifact is provisioned to the tenants. If no abnormal behavior is found during monitoring activity, then execution of the artifact is continued uninterruptedly.

Figure 4:
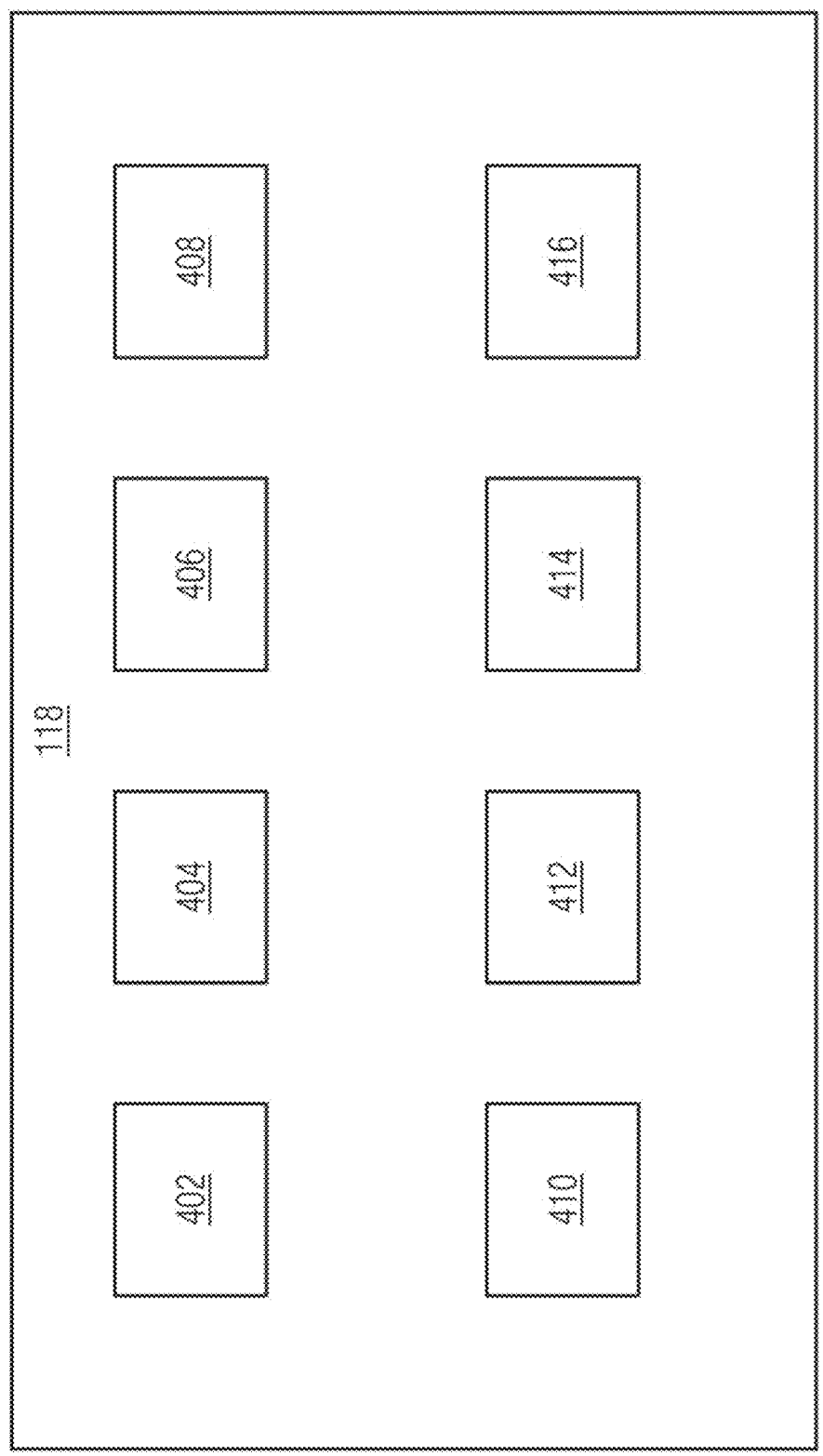
FIG. 4 is a block diagram of an artifact development module capable of developing an artifact to be deployed in a productive environment, according to an embodiment.

FIG. 4 is a block diagram of the artifact development module 118 capable of developing an artifact to be deployed in the productive environment 204, according to an embodiment. The artifact development module 118 includes a developer environment generation module 402, a developer authentication module 404, an artifact generation module 406, an artifact testing module 408, an artifact registration module 410, an artifact assignment module 412, an artifact version manager 414, and a feedback processing module 416.

The development environment generation module 402 is configured to generate an integrated development environment for developing an artifact. In one embodiment, the development environment generation module 402 generates the integrated development environment based on profile information of a requesting developer. In another embodiment, the development environment generation module 402 generates the integrated development environment based on type of artifact to be developed. The artifact may be a cloud application, an edge application, a code snippet, an automation project, a digital twin models, APIs, connectivity configurations, event-based functionality, security applications, simulation models, and the like. The integrated development environment provides a graphical and/or console-based user interface on any of the user devices 130A-N belonging to one or more developers. The graphical user interface also displays needed tools and widgets to develop the artifact.

The developer authentication module 404 authenticates the developer to access the integrated development environment based on login credentials inputted by the developer. The artifact generation module 406 is configured to generate an artifact package for deployment on the cloud computing platform 114 based on user inputs (e.g., drag and drop feature) received from the developer. The artifact generation module 406 is configured to generate a unique identifier for the artifact. The artifact testing module 408 is configured to generate test cases for testing the generated artifact in a test environment. For example, test cases are based on type of artifacts including test data from assets, time series data, etc. The artifact testing module 408 is configured to test the artifact in the test environment using the generated test cases. In some embodiments, the test environment may be a part of the integrated development environment.

The artifact registration module 410 is configured to store the artifact in the artifact repository 128. The artifact registration module 410 is configured to enable or disable specific artifact versions for validation and deployment. The artifact assignment module 412 is configured for assigning the artifact to a provider/deployer for deployment in a productive environment 204 upon successful validation of the artifact. The artifact version manager 414 is configured to manage different versions of the artifact during the entire lifecycle of the artifact using unique identifier. The feedback processing module 416 is configured to process feedback from the artifact validation module 120, the artifact deployment module 122, and the artifact monitoring module 126. The feedback processing module 416 may provide recommendations to the artifact generation module 406 so that the artifact generation module 406 may make necessary medications to the artifact in next version.

Figure 5:
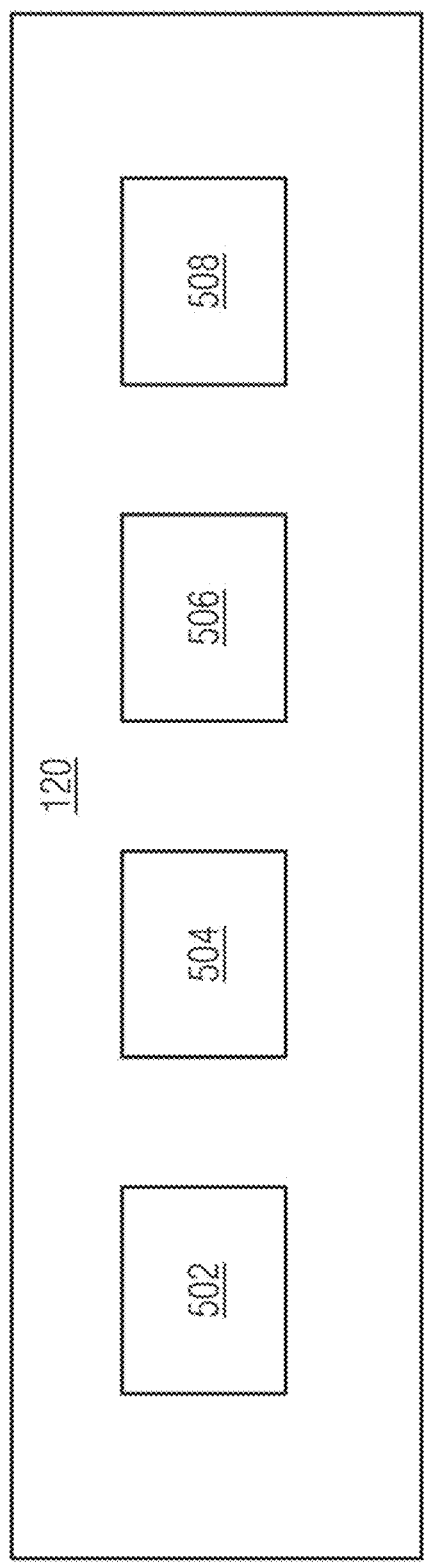
FIG. 5 is a block diagram of an artifact validation module capable of validating the artifact to be deployed in the productive environment, according to an embodiment.

FIG. 5 is a block diagram of the artifact validation module 120 capable of validating the artifact to be deployed in the productive environment 204, according to an embodiment. The artifact validation module 120 includes an artifact detection module 502, an artifact validator 504, a reporting module 506, and a feedback module 508.

The artifact detection module 502 is configured for automatically detecting storing of a new artifact by the artifact development module 118 in the artifact repository 128. For example, the artifact detection module 502 may monitor a repository file to determine the new artifacts stored in the artifact repository 128. Alternatively, the artifact detection module 502 may receive a trigger from the artifact repository 128 when uploading of the new artifact in the artifact repository 128 is complete.

The artifact validator 504 is configured for performing a plurality of validation checks on the artifact to identify issues in the artifact prior to deployment. In one embodiment, a pre-check (e.g., first validation check), static screening (e.g., a second validation check), and dynamic screening (e.g., third validation check) may be performed on the artifact. In an exemplary implementation, the artifact validator 504 is configured to perform pre-check on an artifact package of the artifact. The pre-check is performed on the artifact in order to identify obvious defects in artifacts. For example, the artifact validator 504 may perform virus and malicious code scan on the artifact package, check icon of artifact for compliance, determine adherence of artifact to standards, perform syntax and semantics checks, etc.

Furthermore, the artifact validator 504 is configured to perform static screening of the artifact. For example, the artifact validator 504 performs dependency checks, insecure credential analysis, indicator carving analysis, application asset carving and clearing, etc. The artifact validator 504 may crawl for dependencies and identify vulnerabilities in the dependencies. The artifact validator 504 may crawl for hardcoded certificates, private keys, usernames, password, etc. and identify insecure credentials associated with the artifact. The artifact validator 504 may crawl for hardcoded URLs, IP addresses, domains/checks against threat intelligence database. The artifact validator 504 may crawl for embedded files (e.g., images, stylesheets, scripts, documents) and check against anti-virus engines and threat intelligence database.

Also, the artifact validator 504 is configured to perform dynamic screening on the artifact. In one embodiment, the artifact validator 504 is configured to test the behavior of the artifact in runtime environment by executing the artifact in the sandbox environment 202. In this embodiment, the artifact validator 504 is configured to determine whether the artifact behavior is acceptable when deployed on the cloud computing platform 114. For example, the artifact validator 504 may check for Open Web Application Security Project (OWASP) web-application vulnerabilities, data exfiltration, insecure data storage, API conformance, robustness, performance, user interface/experience, deployment issues, etc.

The artifact validator 504 is also configured to sign the artifact by generating an artifact signature if the artifact passes all the validation checks. For example, the artifact may be signed using a checksum or certificate. In one embodiment, the artifact validator 504 applies secure hashing algorithm such as SHA-256 to the artifact files and generates a unique hash key for the artifact. An exemplary hash key for an artifact is given below:

0xe3b0c44298fc1c149afbf4c8996fb92427ae41e4649b9 34ca495991b7852b855

The artifact validator 504 stores the artifact signature (e.g., the unique hash key) of the signed artifact in the artifact repository 128.

The reporting module 506 is configured for generating a first notification indicating that the artifact has passed the validation process. The feedback module 508 is configured for determining which of the validation checks were unsuccessful. The feedback module 508 is configured for determining reason responsible for unsuccessful validation checks. Also, the feedback module 508 is configured for automatically resolving issues by performing corrective actions computed using machine learning techniques (e.g., trained artificial intelligence models). Furthermore, the feedback module 508 is configured for generating a second notification indicating that the artifact failed validation check(s) and reasons for such failure. The feedback module 508 is configured for sending the second notification to the artifact development module 118.

Figure 6:
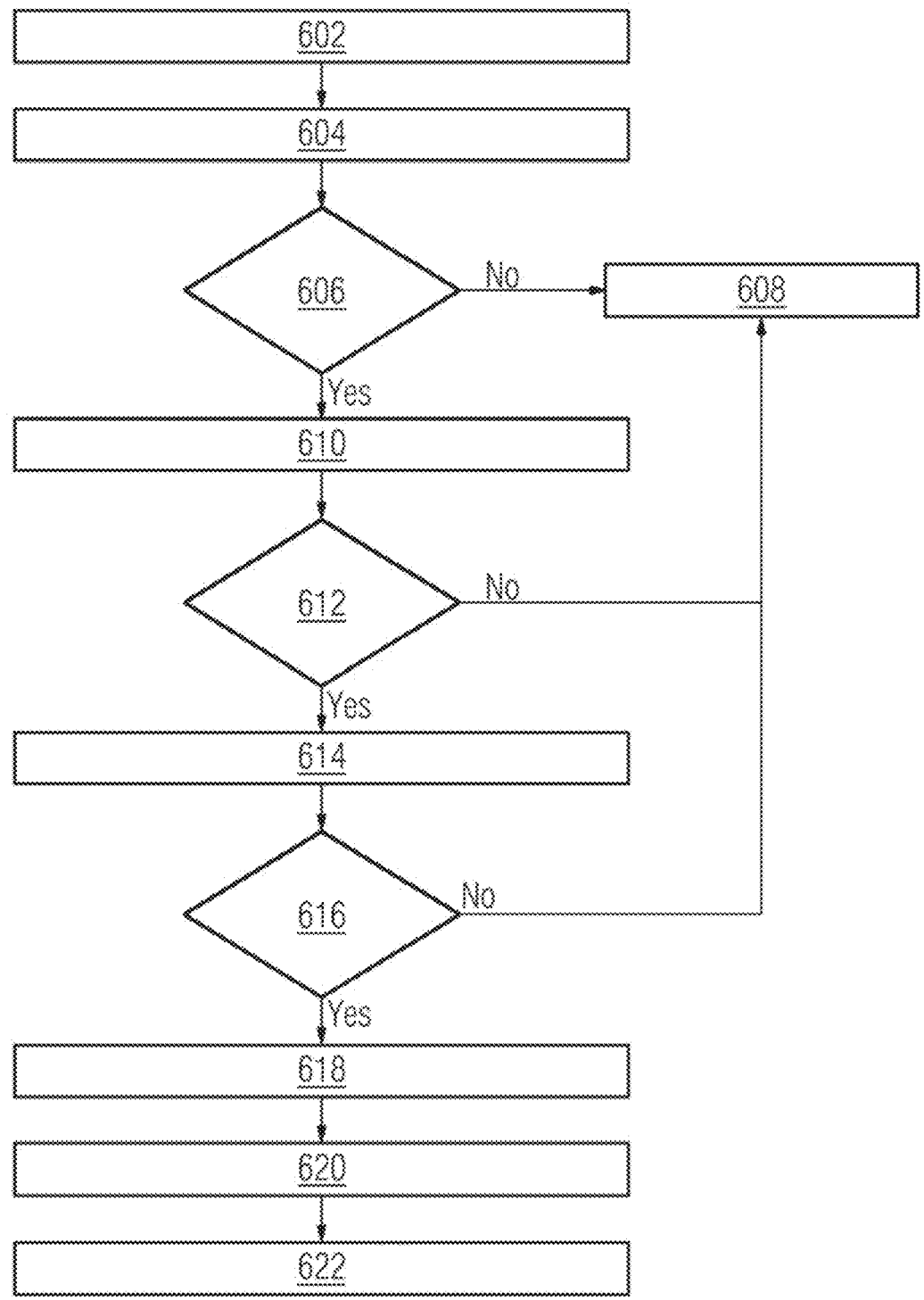
FIG. 6 is a process flowchart illustrating an exemplary method of performing validation of artifacts to be deployed in the productive environment, according to an embodiment.

FIG. 6 is a process flowchart 600 illustrating an exemplary method of performing validation of artifacts to be deployed in the productive environment 204, according to an embodiment. At act 602, an event associated with an artifact in the artifact repository 128 is automatically determined. For example, the event may be act of storing the artifact package in the artifact repository 128 by the artifact development module 118. In such case, the artifact to be deployed in the productive environment 204 is identified from the artifact repository 128. Alternatively, the event may be act of updating the artifact package stored in the artifact repository 128. If there are several artifacts waiting for validation, the newly determined artifact is added to the queue. If the multiple artifacts are uploaded simultaneously, the artifacts are added to the respective queue based on the determined category of the artifact. For example, several queues of artifacts may be maintained; each queue contains artifacts of a specific category.

At act 604, a pre-check of the artifact files is performed to determine obvious defects in the artifact. At act 606, it is determined whether pre-check performed on the artifact is successful. If the artifact fails the pre-check, then at act 608, a feedback indicating that the artifact failed one of the validation checks is sent to owner of the artifact (e.g., the developer). Alternatively, the artifact is modified according to pre-defined corrective actions and the pre-check of the modified artifact is performed. In some embodiments, the pre-defined corrective actions are determined using machine learning techniques. If the artifact passes the pre-check, then at act 610, a static screening of the artifact files is performed. For example, the static screening of the artifact includes dependency checks, insecure credential analysis, indicator carving analysis, application asset carving and clearing, etc.

At act 612, it is determined whether the static screening performed on the artifact is successful. If the artifact fails static screening, then at act 608, a feedback indicating that the artifact failed one of the validation checks is sent to owner of the artifact (e.g., the developer). Alternatively, the artifact is modified according to pre-defined corrective actions and the static screening of the modified artifact is performed. In some embodiments, the pre-defined corrective actions are determined using machine learning techniques. If the artifact passes the static screening, then at act 614, a dynamic screening of the artifact files is performed. In one embodiment, dynamic screening of the artifact involves executing the artifact in a sandbox environment 202 to test behavior of the artifact during runtime. In this embodiment, it is determined whether behavior of the artifact is within the acceptable standard when deployed on the cloud computing platform 114.

At act 616, it is determined whether the dynamic screening performed on the artifact is successful. If the artifact fails dynamic screening, then at act 608, a feedback indicating that the artifact failed one of the validation checks is sent to owner of the artifact (e.g., the developer). Alternatively, the artifact is modified according to pre-defined corrective actions and the static screening of the modified artifact is performed. In some embodiments, the pre-defined corrective actions are determined using machine learning techniques.

If the dynamic screening of the artifact is successful, then at act 618, an artifact signature for the artifact is generated using the artifact files. For example, a hash key is generated by applying SHA-256 algorithm on the artifact files. At act 620, the artifact is signed using the artifact signature. That is, the artifact signature is linked to identifier associated with the artifact. At act 622, the artifact signature assigned to the artifact is stored in the artifact repository 128. Also, a notification indicating that the artifact is successfully validated is sent to the artifact developer module 118. In certain examples, the pre-check, static screening, and dynamic screening of the artifact may be performed in parallel. This would save time required for validating the artifact. In certain examples, there may be more validation checks in addition to pre-check, static screening, and dynamic screening of artifacts. Also, the type of validation checks performed in each of pre-check, static screening and dynamic screening may vary based on category of artifact and validation requirements for deploying the artifact on the cloud computing platform 114.

Figure 7:
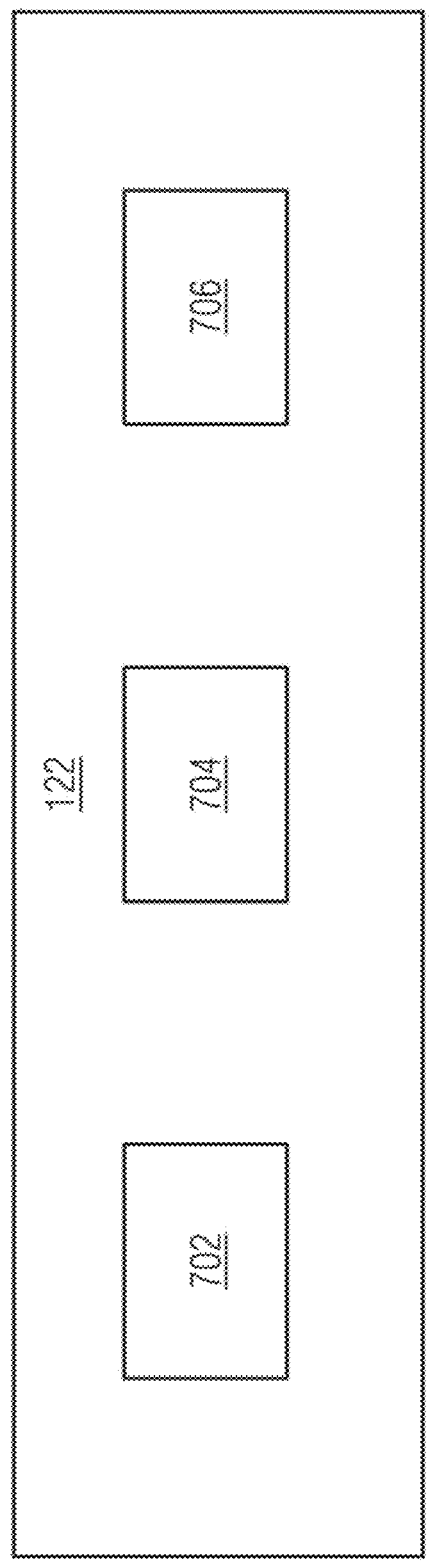
FIG. 7 is a block diagram of the artifact deployment module capable of authenticating and deploying the artifact in the productive environment, according to an embodiment.

FIG. 7 is a block diagram of the artifact deployment module 122 capable of authenticating and deploying the artifact in the productive environment 204, according to an embodiment. The artifact deployment module 122 includes an authentication module 702, a deployment module 704, and a notification module 706.

The authentication module 702 is configured to authenticate the artifact requested to be deployed in the productive environment 204 based on the artifact signature. In one embodiment, the authentication module 702 re-generates unique hash key by applying secure hashing algorithm (e.g., SHA-256) on the artifact files. The authentication module 702 compares the re-generated hash key with the hash key associated with the artifact stored in the artifact repository 128. The authentication module 702 determines whether both the hash keys match. The authentication module 702 triggers an event to deploy the artifact if the both hash keys match.

The deployment module 704 is configured to deploy the artifact in the productive environment 204 based on the event triggered by the authentication module 702. The deployment module 704 is configured to determine one or more components required for deploying the artifact package in the productive environment 204 of the cloud computing system 102. For example, the components may include specific APIs and database services required to deploy the artifact in the productive environment 204. The deployment module 704 is configured to provide a list of recommended components required for deploying the artifact in the productive environment 204. This enables the provider to select and download the specific APIs and database services for deploying the artifact in the productive environment 204.

The notification module 706 is configured to notify the owner/deployer of the artifact in case the authentication fails. The notification module 706 is also configured to notify the provider/deployer in case the artifact is successfully deployed in the productive environment 204.

Figure 8:
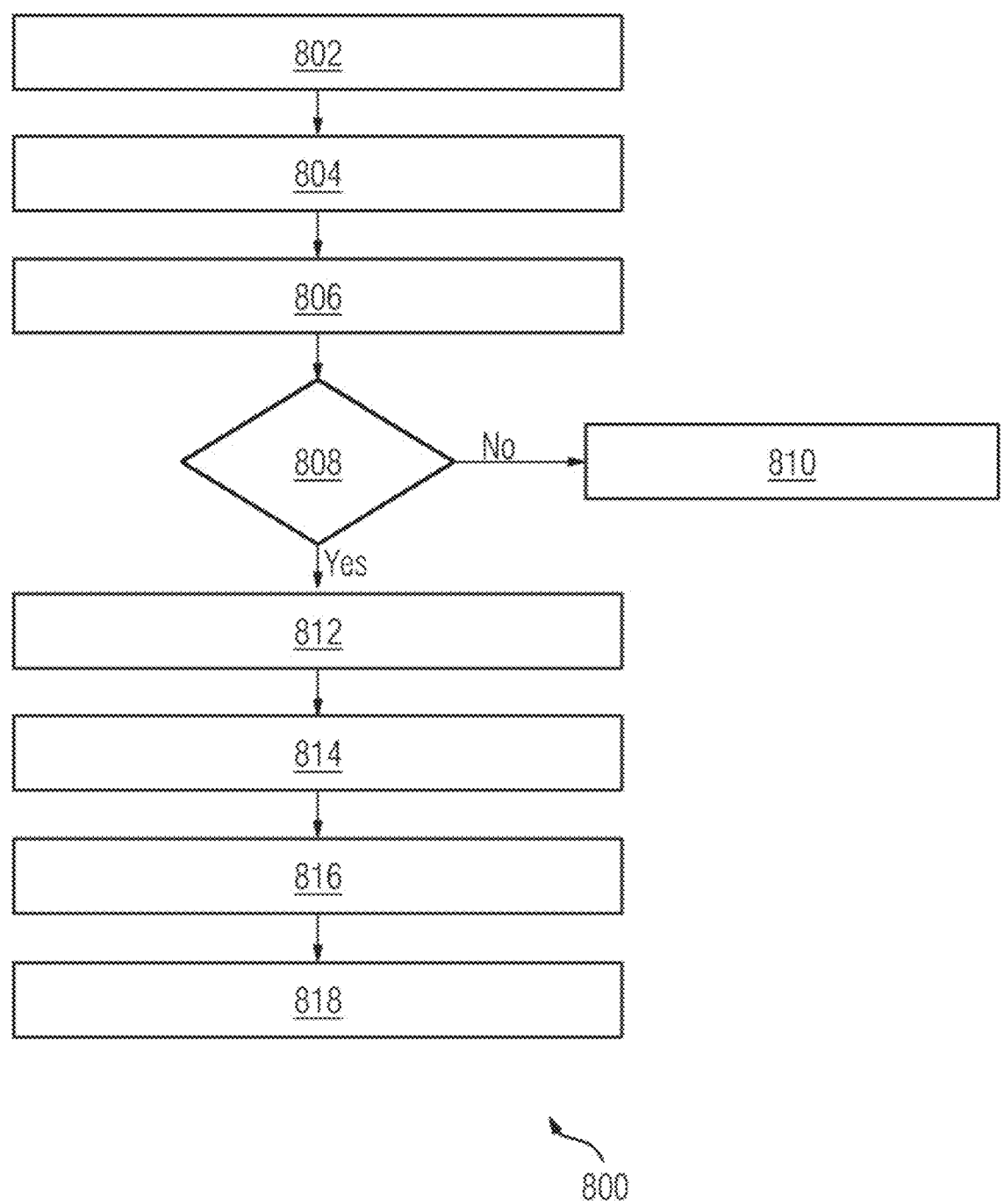
FIG. 8 is a process flowchart illustrating an exemplary method of authenticating and deploying artifacts in the productive environment, according to an embodiment.

FIG. 8 is a process flowchart 800 illustrating an exemplary method of authenticating and deploying artifacts in the productive environment 204 on the cloud computing platform 114, according to the embodiment. At act 802, a request to deploy the artifact on the cloud platform 114 is received. In one embodiment, the artifact may be assigned to a specific provider/deployer for deployment in the productive environment 204 either automatically or by the owner of the artifact upon successful validation of the artifact. The assignment of the artifact is sent as a request to deploy the artifact on the cloud computing platform 114. Alternatively, the provider/deployer may search for a desired artifact in the artifact repository 128 using an artifact identifier/name. The provider/deployer may send a request to the artifact deployment module 124 to deploy the artifact.

At act 804, signature is re-generated using artifact files associated with the artifact to be deployed on the cloud computing platform 114. For example, a hash key is re-generated by applying SHA-256 algorithm on the artifact files. At act 806, the artifact signature associated with the artifact is retrieved from the artifact repository 128. At act 808, it is determined whether the artifact signature matches with the re-generated artifact signature. If no match is found, then at act 810, a notification is generated indicating that the artifact is not genuine. Accordingly, the request to deploy the artifact on the cloud computing platform 114 is rejected.

If match is found, at act 812, the artifact package associated with the artifact and associated files (e.g., APIs, database files, etc.) are retrieved from the artifact repository 128. At act 816, the artifact is deployed in the productive environment 204 of the cloud platform 114. At act 818, the artifact is provisioned to one or more tenants of the cloud platform 114. For example, the artifact is assigned to the tenants so that the tenants may use the artifact deployed in the productive environment 204. The artifact is assigned to tenants who have subscribed to the artifact. In addition, the tenants may assign the artifact to sub-tenants so that sub-tenants may access the artifact.

Figure 9:
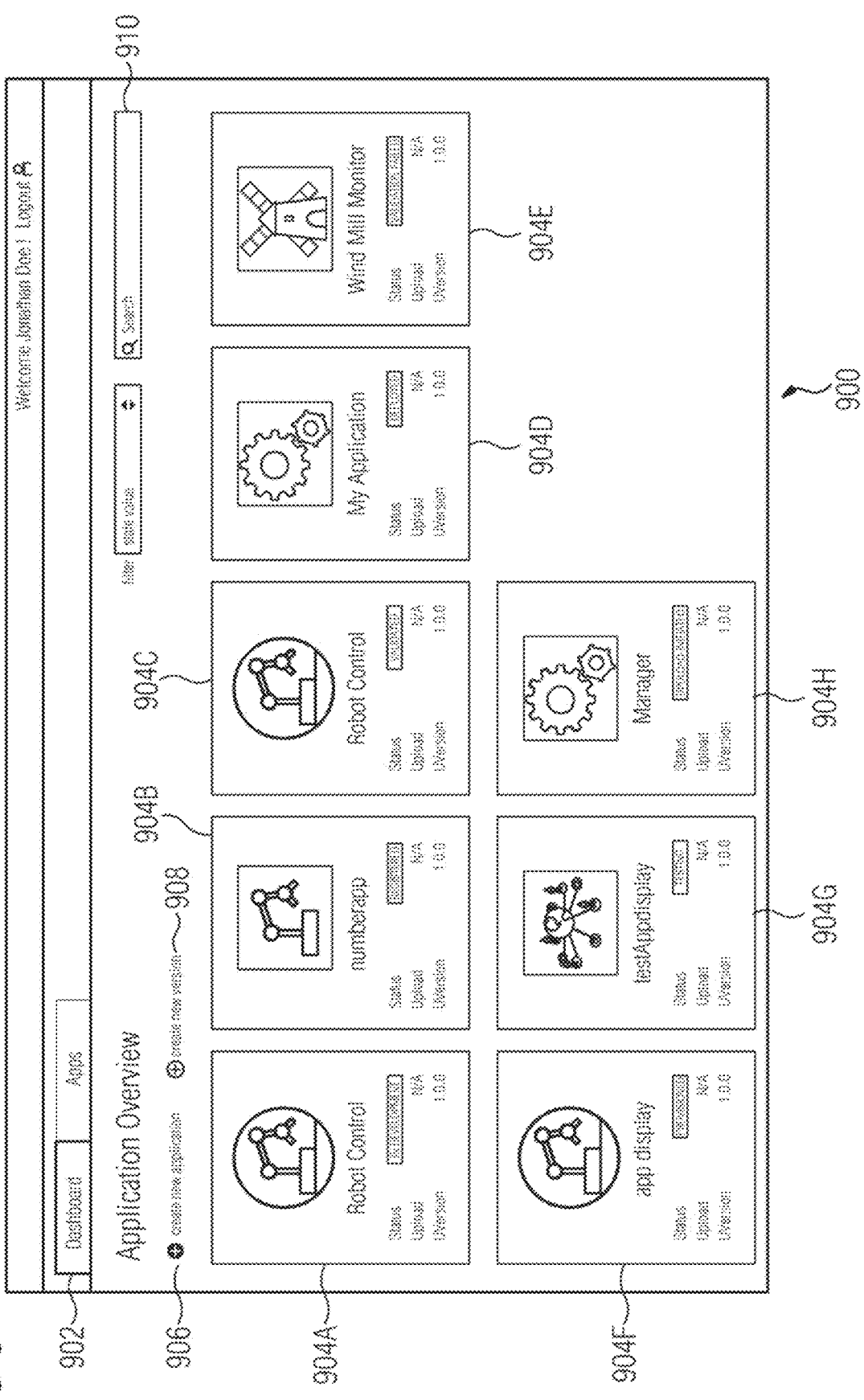
FIG. 9 illustrates an example of a graphical user interface displaying different applications associated with a developer.

FIG. 9 illustrates a graphical user interface 900 displaying different artifacts associated with a developer. In FIG. 9, the graphical user interface 900 displays a dashboard 902 associated with a developer. The developer may access the dashboard 902 by signing-in to a development environment provided by the cloud computing platform 114. The dashboard 902 displays a grid layout of different applications 904A-H created by a developer (e.g., Jonathan Doe). The dashboard 902 displays icon of the applications 904A-H, state of the applications 904A-H (e.g., validation failed, validation successful, not validated, deployed, provisioned, in development, testing, registered, uploaded, etc.), and version number associated with the applications 904A-H. The dashboard 902 enables the developer to create a new application using 'create new application' link 906 or a new version of the artifact using 'create new version' link 908. The dashboard 902 allows the developer to search of specific applications from the plurality of application 904A-H using a search bar 910.

Figure 10:
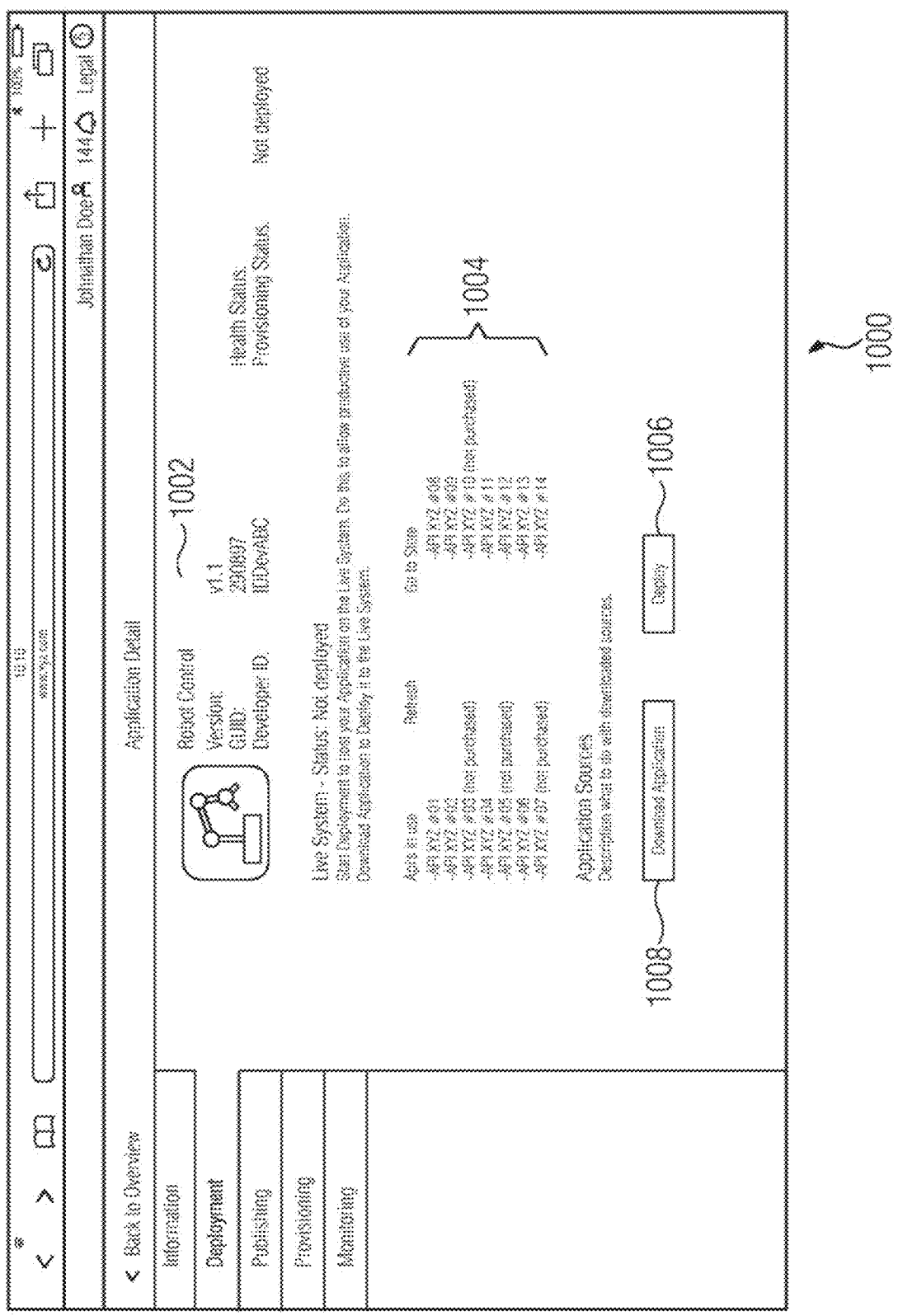
FIG. 10 illustrates an example of a graphical user interface showing an application to be deployed in the productive environment.

FIG. 10 illustrates a graphical user interface 1000 showing an application to be deployed in the productive environment 204. In FIG. 10, the graphical user interface 1000 depicts details 1002 of an application (e.g., Robot Control) ready for deployment in the productive environment 204. The details of the application are displayed in the graphical user interface 1000 of a provider based on assignment of the application by a developer upon successful validation of the application. The graphical user interface 1000 displays APIs 1004 required for deployment of the application on a live system (e.g., the productive environment 204). The graphical user interface 1000 provides a deploy button 1006 which enables the provider/deployer to trigger deployment of the application in the productive environment 204. Also, the graphical user interface 1000 provides a download button 1008 which enables the provider/deployer to download an application package (e.g., binary code, APIs, manifest files) of the application.

Figure 11:
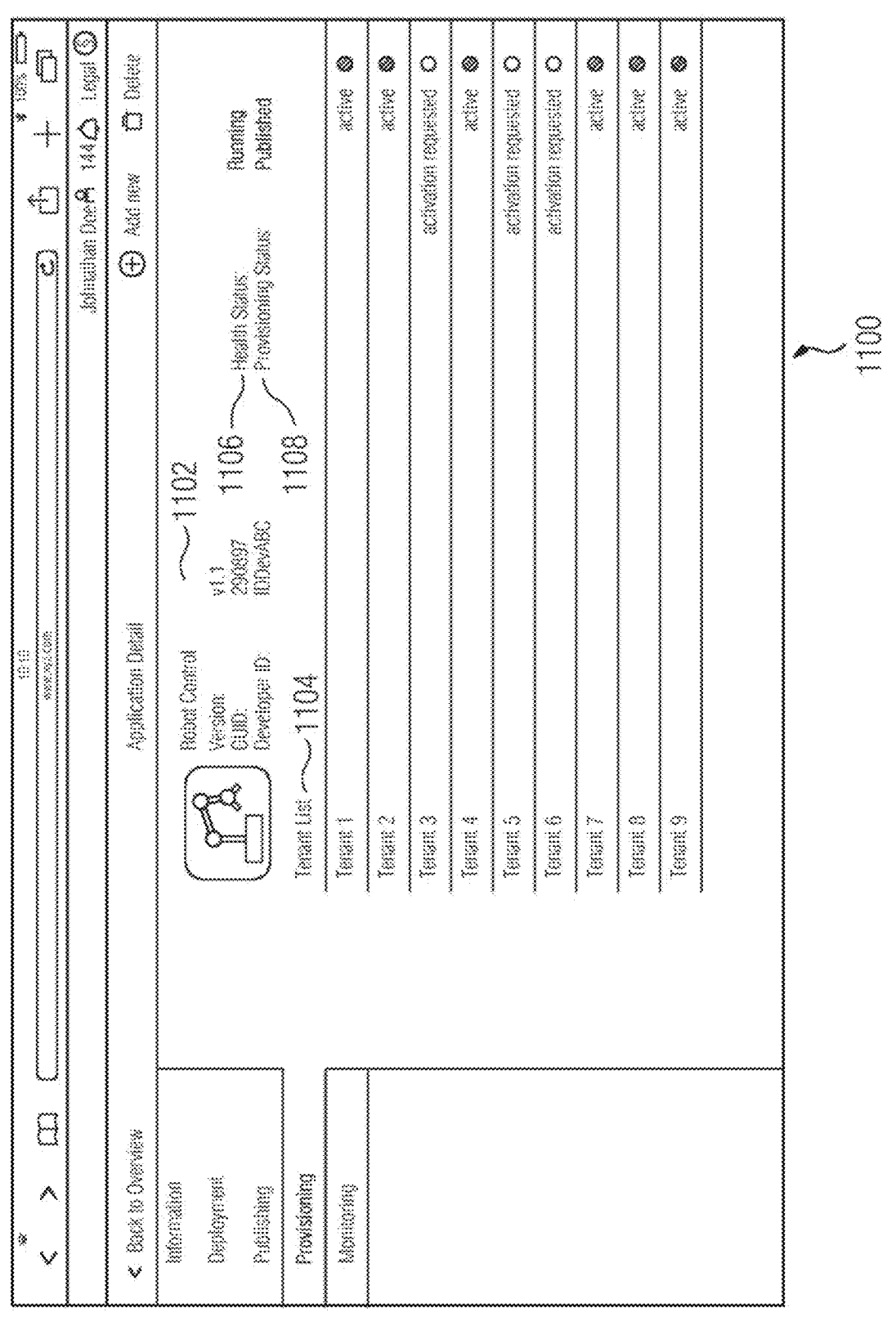

FIG. 11 illustrates a graphical user interface 1100 showing status of an application provisioned to tenants. In FIG. 11, the graphical user interface 1100 displays details of the application (e.g., Robot Control) provisioned to the tenants 1104. For example, the graphical user interface 1100 displays name of the application as 'Robot Control', a version of the application as 'v1.1', a unique identifier of the application as '290897', and a developer identifier as 'IDDevABC'. Also, the graphical user interface 1100 displays health status 1106 of the application. For example, the health status 1106 of the application 'Robot Control' is displayed as 'Running'. The graphical user interface 1100 displays provisioning status 1108 of the application. For example, the provisioning status 1106 of the application 'Robot Control' is displayed as 'Published'. Also, the graphical user interface 1100 displays status 1110 of the application with respect to each of the tenants 1 to 9 in the tenant list 1104, who have subscribed to the application. For example, the graphical user interface 1100 displays status 1110 of the application 'Robot Control' with respect to the tenant 1 as 'active'. Similarly, the graphical user interface 1100 displays status 1110 of the application 'Robot Control' with respect to the tenant 3 as 'activation requested'. That is, the tenant 3 has requested the provider to activate the application 'Robot Control'.

Figure 12:
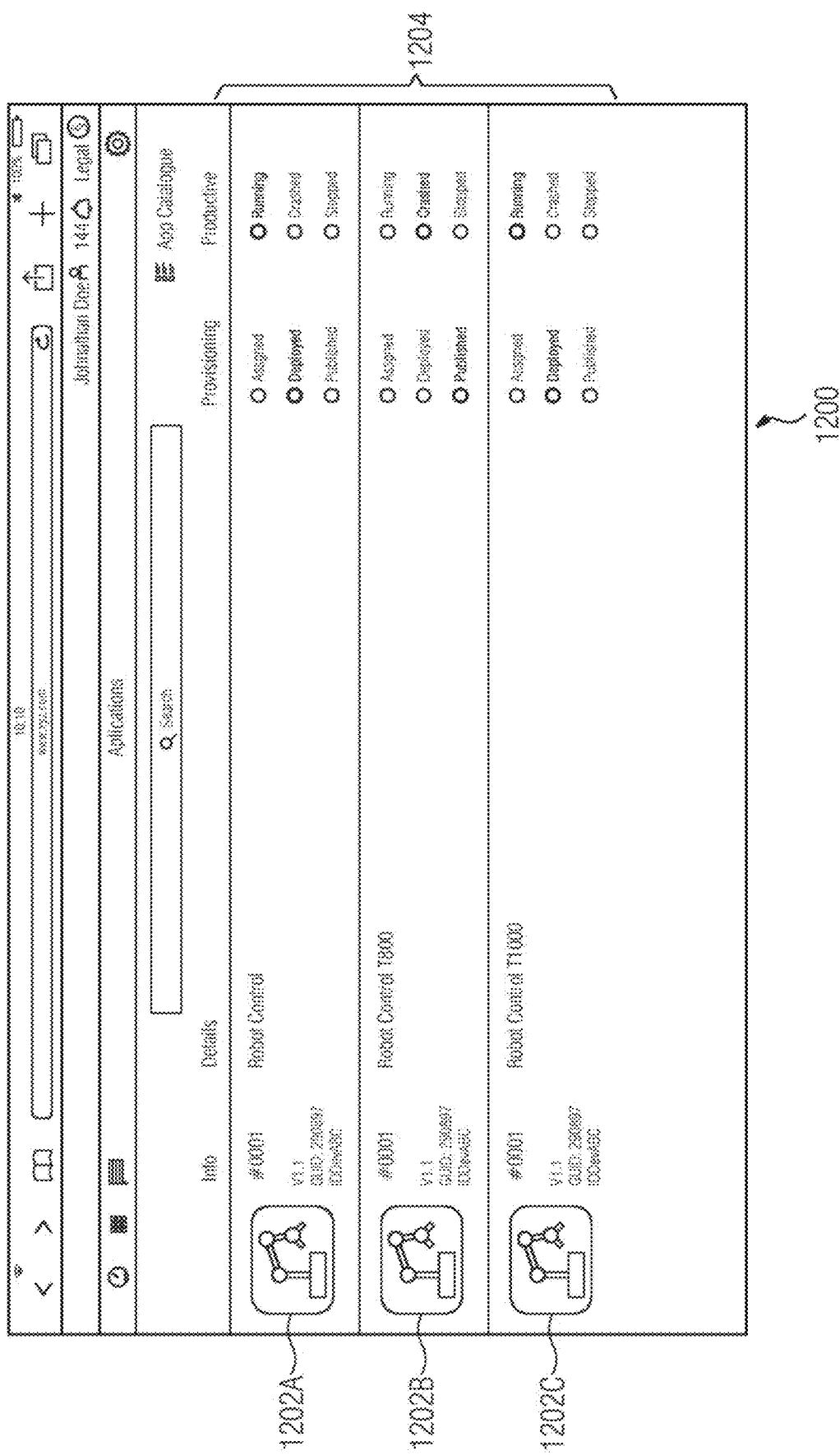
FIG. 12 illustrates an example of a graphical user interface view showing status of different applications associated with the provider.

FIG. 12 illustrates a graphical user interface 1200 showing lifecycle status information of different applications 1202A-C associated with the provider. In FIG. 12, the graphical user interface 1200 displays real-time lifecycle status 1204 of each instance of the applications 1202A-C deployed by the provider in the productive environment 204. The lifecycle status 1204 may indicate whether the respective applications 1202A-C as running, deployed, published, crashed, stopped, assigned and so on corresponding to a provisioning stage and a productive stage. For example, the graphical user interface 1200 displays lifecycle status 1204 of an application 1202A (e.g., Robot Control) in a provisioning stage as 'deployed', and 'running' in a productive stage (e.g., runtime stage).

Figure 13:
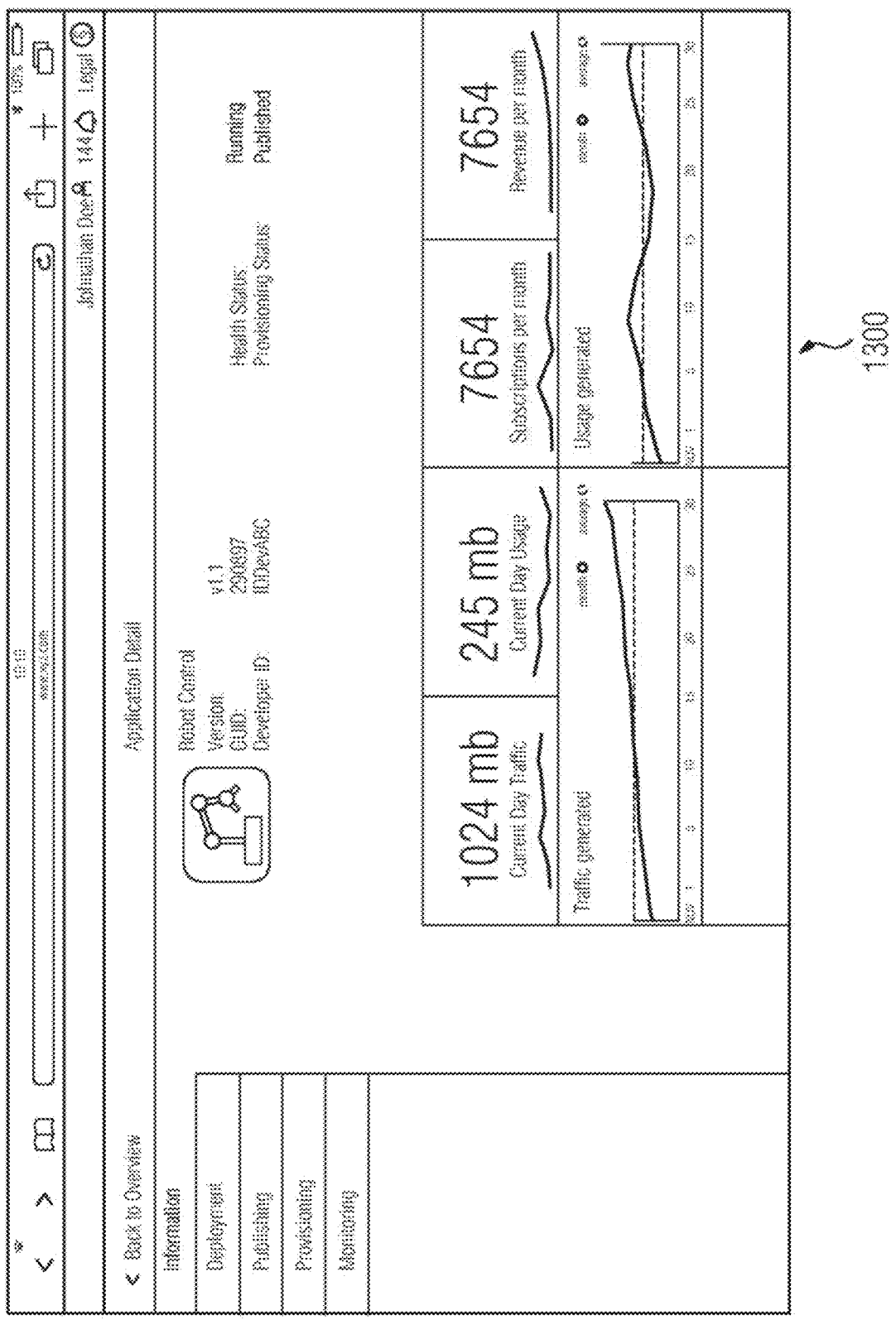
FIG. 13 illustrates an example of a graphical user interface showing runtime behavior of the application being monitored.

FIG. 13 illustrates a graphical user interface 1200 showing runtime behavior of applications being monitored. In FIG. 12, the graphical user interface 1300 displays real time status of the provisioned application (e.g., Robot Control) which is monitored by the artifact monitoring module 126 in real time. The real time status indicates health status of the application, traffic data, usage data, trend comparison, subscription information, etc. The graphical user interface 1200 may also display abnormal behavior of the application if detected during monitoring of the application.

Figure 14:
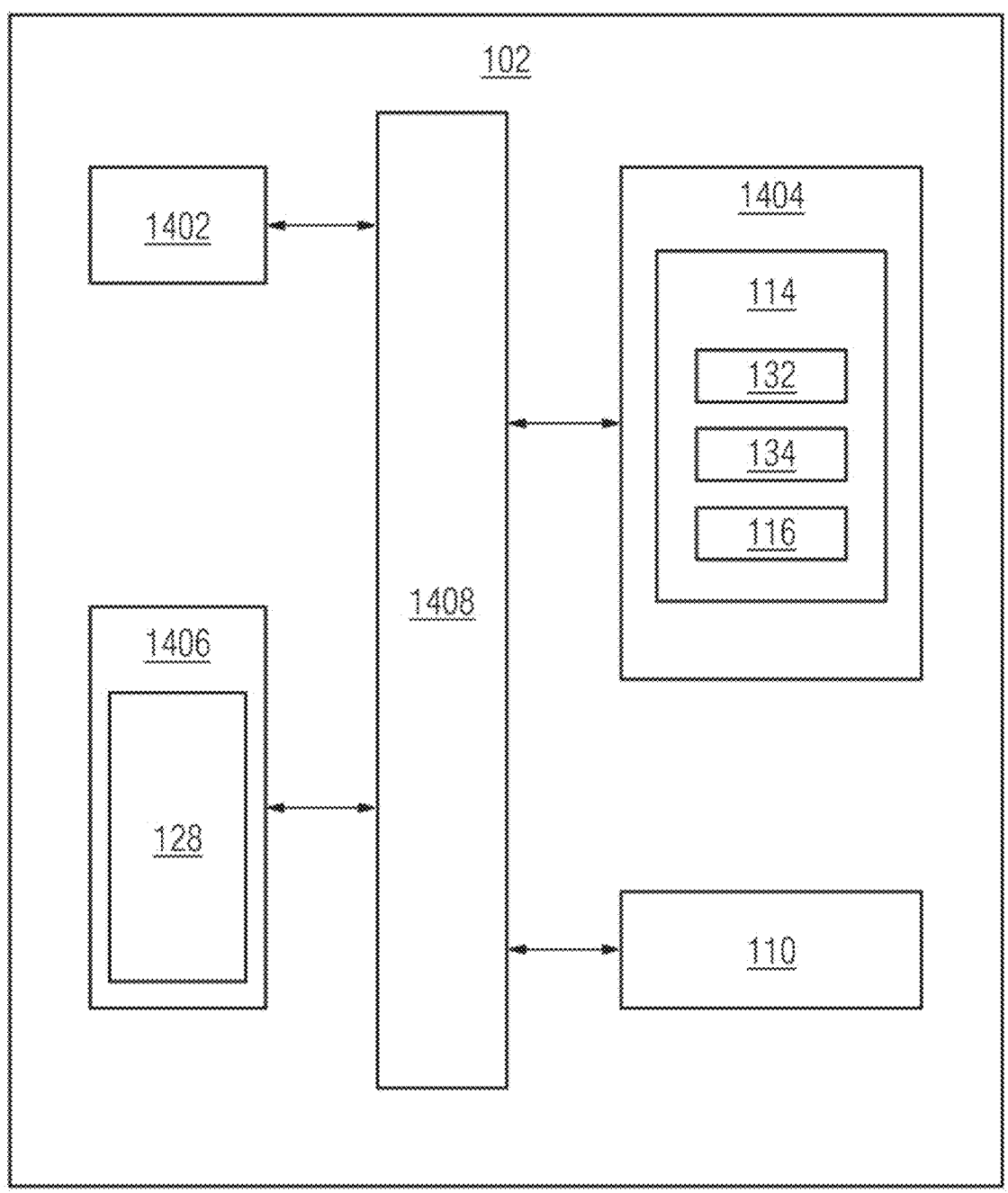
FIG. 14 is a schematic representation of the cloud computing system such as those shown in FIG. 1, according to an embodiment.

FIG. 14 is a schematic representation of the cloud computing system 102 such as those shown in FIG. 1, according to an embodiment. The cloud computing system 102 includes processing units 1402, a memory unit 1404, a storage unit 1406, a communication interface 1408, and the cloud interface 110.

The processing units 1402 may be one or more processor (e.g., servers). The processing units 1402 is capable of executing machine-readable instructions stored on a computer-readable storage medium such as the memory unit 1404 for performing one or more functionalities described in the foregoing description including but not limited to delivering cloud services to authorized tenants, and managing artifacts during its lifecycle. The memory unit 1404 includes the cloud computing platform 114 stored in the form of machine-readable instructions and executable by the processing units 1402. Alternatively, the cloud computing platform 114 may take a form of hardware such as a processor with embedded software. The cloud computing platform includes the artifact lifecycle management module 116, the access control module 132, and the artifact execution module 134 stored in the form of machine-readable instructions executable by the processing units 1402.

The storage unit 1406 may be volatile or non-volatile storage. In the embodiment, the storage unit 1406 is includes the artifact repository 128 for storing artifact packages and artifact signatures. The storage unit 1406 may also store raw or aggregated data received from the industrial plant 106. The communication interface 1408 acts as an interconnect device or system between different components of the cloud computing system 102. The communication interface 1108 may enable communication between the processing units 1402, the memory unit 1404, and the storage units 1106. The processing units 1402, the memory unit 1404, and the storage unit 1406 may be located in same location or at different locations remote from the industrial plant 106.

The cloud interface 110 is configured to establish and maintain communication links with the industrial plant 106. Also, the cloud interface 110 is configured to maintain a communication channel between the cloud computing system 102 and the user devices 130A-N.

In various embodiments, the cloud computing system 102 provides a platform for managing different types of artifacts throughout its lifecycle. The cloud computing system 102 enables developing, testing, validating, deploying, publishing, provisioning, and real-time execution of artifacts responsible for delivering cloud services such as data storage, data analysis, data visualization. The cloud services are intended to enable commissioning, configuring, monitoring, controlling, and maintenance of assets in a facility including industrial plants. The cloud computing system 102 provides closed-loop management of artifacts during its lifecycle by providing feedback from validation, deployment, and run-time execution of artifacts in real-time, resulting in low down time and efficient management of the artifacts. The cloud computing system 102 provides secured deployment of artifacts by automatically validating and authenticating the artifacts prior to deployment in the productive environment. Also, the cloud computing system 102 monitors performance of artifacts in real-time and reports and anomalies detected during execution of the artifacts, thereby preventing abnormal operation of artifacts and hazards.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of managing an artifact during a lifecycle of the artifact on a cloud computing system, the method comprising:
    identifying an artifact to be deployed on the cloud computing system, wherein the artifact is a code snippet, a hardware configuration, a digital twin model, an application programming interface (API), a simulation model, a connectivity solution, firmware, or a device configuration;
    performing, by the cloud computing system, one or more validation checks on the artifact to be deployed;
    generating, by the cloud computing system, an artifact signature for the validated artifact using an artifact package;
    deploying, by the cloud computing system, the validated artifact within a productive environment of the cloud computing system, the productive environment being a live system which makes the artifact usable by one or more tenants such that the deployed artifact is executed in the productive environment when a tenant of the one or more tenants accesses the artifact; and
    provisioning, by the cloud computing system, the deployed artifact to one or more tenants of the cloud computing system by assigning the artifact to the tenant.

2. The method of claim 1, further comprising:
    providing an integrated development environment for developing the artifact to be deployed on the cloud computing system, the development environment providing a user interface with tools and software, hosted on a cloud computing platform such that the development environment enables a developer to develop and test artifacts to be deployed on the cloud computing platform; and
    generating an artifact package associated with the artifact based on inputs received via the integrated development environment.

3. The method of claim 2, further comprising:
    performing one or more tests on the artifact package using the integrated development environment based on one or more test cases.

4. The method of claim 2, further comprising:
    storing the artifact package associated with the artifact in an artifact repository using the integrated development environment.

5. The method of claim 4, wherein the deploying of the artifact in the productive environment of the cloud computing system comprises:
    verifying authenticity of the artifact using the artifact signature associated with the artifact by comparing a re-generated hash key with a hash-key associated with the artifact stored in the artifact repository; and
    deploying the artifact in the productive environment of the cloud computing system when the artifact is successfully verified.

6. The method of claim 2, wherein the providing of the integrated development environment for developing the artifact comprises:
    determining a type of integrated development environment required for developing the artifact; and
    generating the integrated development environment of the determined type on a graphical user interface of a user device.

7. The method of claim 1, further comprising:
assigning a unique identifier to the artifact package associated with the artifact.

8. The method of claim 1, wherein the performing of the validation checks on the artifact comprises:
determining a category of the artifact to be validated based on a unique identifier associated with the artifact;
determining one or more validation checks suitable for validating the artifact from a plurality of validation checks based on the determined category of the artifact; and
validating the artifact to be deployed in the productive environment of the cloud computing system by performing the determined validation checks on the artifact.

9. The method of claim 8, wherein the validating of the artifact to be deployed in the productive environment of the cloud computing system comprises:
determining whether the validation checks performed on the artifact are successful;
generating a notification indicating the validation checks are successful when the validation checks are successful; or
determining defects in the artifact and corrective actions to be performed to resolve the defects when any of the validation checks are unsuccessful, and performing one or more corrective actions on the artifact package to resolve the defects.

10. The method of claim 9, further comprising:
providing a feedback to an owner of the artifact,
wherein the feedback indicates that the validation of artifact was unsuccessful along with the determined defects and the corrective actions recommended to resolve the defects in the artifact.

11. The method of claim 1, further comprising:
assigning the artifact to at least one provider for deploying the artifact in the productive environment of the cloud computing system.

12. The method of claim 1, further comprising:
publishing the artifact deployed in the productive environment of the cloud computing system such that the artifact deployed in the productive environment is configured to be searched and displayed to the one or more tenants of the cloud computing system, thereby enabling the tenants to subscribe access to the artifact.

13. The method of claim 1, wherein the provisioning of the artifact to the one or more tenants of the cloud computing system comprises:
creating a set-up route between the deployed artifact and the one or more tenants of the cloud computing system to enable the one or more tenants to view, access, and use the artifact via a cloud computing platform.

14. The method of claim 1, further comprising:
monitoring performance of the artifact deployed in the productive environment in real-time;
determining abnormal behavior of the artifact deployed in the productive environment in real-time, wherein the abnormal behavior is an issue associated with the performance, a resource consumption, or an abnormal function; and
generating a notification indicating the abnormal behavior of the artifact.

15. The method of claim 14, further comprising:
suspending execution of the artifact in the productive environment of the cloud computing system.

16. The method of claim 1, further comprising:
determining one or more components required for deploying the artifact package in the productive environment of the cloud computing system; and
providing a list of recommended components required for deploying the artifact in the productive environment of the cloud computing system.

17. The method of claim 1, further comprising:
providing access to the artifact to the one or more tenants based on a role and permissions assigned to each tenant of the one or more tenants.

18. The method of claim 1, wherein the artifact is the hardware configuration.

19. The method of claim 1, wherein the artifact is the digital twin model.

20. The method of claim 1, wherein the artifact is the application programming interface (API).

21. The method of claim 1, wherein the artifact is the simulation model.

22. A cloud computing system comprising:
one or more processing units; and
at least one memory unit communicatively coupled to the one or more processing units,
wherein the at least one memory unit, with the one or more processing units, is configured to:
identify an artifact to be deployed on the cloud computing system, wherein the artifact is a code snippet, a hardware configuration, a digital twin model, an application programming interface (API), a simulation model, a connectivity solution, firmware, or a device configuration;
perform, by the cloud computing system, one or more validation checks on the artifact to be deployed on the cloud computing system;
generate, by the cloud computing system, an artifact signature for the validated artifact using an artifact package;
deploy, by the cloud computing system, the validated artifact within a productive environment of the cloud computing system, the productive environment being a live system which makes the artifact usable by one or more tenants such that the deployed artifact is executed in the productive environment when a tenant of the one or more tenants accesses the artifact; and
provide, by the cloud computing system, the deployed artifact to one or more tenants of the cloud computing system by assigning the artifact to the tenant.

23. The cloud computing system of claim 22, wherein the at least one memory unit, with the one or more processing units, is further configured to:
provide an integrated development environment for developing the artifact to be deployed on the cloud computing system, the development environment providing a user interface with tools and software, hosted on a cloud computing platform such that the development environment enables a developer to develop and test artifacts to be deployed on the cloud computing platform; and
generate an artifact package associated with the artifact based on inputs received via the integrated development environment.

24. The cloud computing system of claim 23, wherein the at least one memory unit, with the one or more processing units, is further configured to:
perform one or more tests on the artifact package using the integrated development environment based on one or more test cases.

25. The cloud computing system of claim 23, wherein the provision of the integrated development environment for developing the artifact comprises:
- a determination of a type of integrated development environment required for developing the artifact; and
- a generation the integrated development environment of the determined type on a graphical user interface of a user device.

26. The cloud computing system of claim 23, wherein the at least one memory unit, with the one or more processing units, is further configured to:
- store the artifact package associated with the artifact in an artifact repository using the integrated development environment.

27. The cloud computing system of claim 26, wherein the deployment of the artifact in the productive environment of the cloud computing system comprises:
- a verification of an authenticity of the artifact using the artifact signature associated with the artifact by comparing a re-generated hash key with a hash-key associated with the artifact stored in the artifact repository; and
- a deployment of the artifact in the productive environment of the cloud computing system when the artifact is successfully verified.

28. The cloud computing system of claim 22, wherein the at least one memory unit, with the one or more processing units, is further configured to:
- assign a unique identifier to the artifact package associated with the artifact.

29. The cloud computing system of claim 22, wherein the validation checks on the artifact comprises:
- a determination of a category of the artifact to be validated based on a unique identifier associated with the artifact;
- a determination of one or more validation checks suitable for validating the artifact from a plurality of validation checks based on the determined category of the artifact; and
- a validation of the artifact to be deployed in the productive environment of the cloud computing system by performing the determined validation checks on the artifact.

30. The cloud computing system of claim 29, wherein the validation of the artifact to be deployed in the productive environment of the cloud computing system comprises:
- a determination of whether the validation checks performed on the artifact are successful;
- a generation of a notification indicating the validation checks are successful when the validation checks are successful; or
- a determination of defects in the artifact and corrective actions to be performed to resolve the defects when any of the validation checks are unsuccessful, and performing one or more corrective actions on the artifact package to resolve the defects.

31. The cloud computing system of claim 30, wherein the at least one memory unit, with the one or more processing units, is further configured to:
- provide feedback to an owner of the artifact, wherein the feedback indicates that the validation of artifact was unsuccessful along with the determined defects and the corrective actions recommended to resolve the defects in the artifact.

32. The cloud computing system of claim 22, wherein the at least one memory unit, with the one or more processing units, is further configured to:
- assign the artifact to at least one provider for deploying the artifact in the productive environment of the cloud computing system.

33. The cloud computing system of claim 22, wherein the at least one memory unit, with the one or more processing units, is further configured to:
- publish the artifact deployed in the productive environment of the cloud computing system such that the artifact deployed in the productive environment is configured to be searched and displayed to the one or more tenants of the cloud computing system, thereby enabling the tenants to subscribe access to the artifact.

34. The cloud computing system of claim 22, wherein the provisioning of the artifact to the one or more tenants of the cloud computing system comprises:
- a creation of a set-up route between the deployed artifact and the one or more tenants of the cloud computing system to enable the one or more tenants to view, access, and use the artifact via a cloud computing platform.

35. The cloud computing system of claim 22, wherein the at least one memory unit, with the one or more processing units, is further configured to:
- monitor performance of the artifact deployed in the productive environment in real-time;
- determine abnormal behavior of the artifact deployed in the productive environment in real-time, wherein the abnormal behavior is an issue associated with the performance, a resource consumption, or an abnormal function; and
- generate a notification indicating the abnormal behavior of the artifact.

36. The cloud computing system of claim 35, wherein the at least one memory unit, with the one or more processing units, is further configured to:
- suspend execution of the artifact in the productive environment of the cloud computing system.

37. The cloud computing system of claim 22, wherein the at least one memory unit, with the one or more processing units, is further configured to:
- determine one or more components required for deploying the artifact package in the productive environment of the cloud computing system; and
- provide a list of recommended components required for deploying the artifact in the productive environment of the cloud computing system.

38. A non-transitory computer readable storage medium comprising a computer program having program code, wherein the computer program, when executed by a processing unit of a cloud computing system, is configured to cause the cloud computing system to:
- identify an artifact to be deployed on the cloud computing system, wherein the artifact is a code snippet, a hardware configuration, a digital twin model, an application programming interface (API), a simulation model, a connectivity solution, firmware, or a device configuration;
- perform, by the cloud computing system, one or more validation checks on the artifact to be deployed on the cloud computing system;
- generate, by the cloud computing system, an artifact signature for the validated artifact using an artifact package;
- deploy, by the cloud computing system, the validated artifact within a productive environment of the cloud computing system, the productive environment being a live system which makes the artifact usable by one or more tenants such that the deployed artifact is executed in the productive environment when a tenant of the one or more tenants accesses the artifact; and provide, by the cloud computing system, the deployed artifact to one or more tenants of the cloud computing system by assigning the artifact to the tenant.

\* \* \* \* \*